(12) United States Patent
Sakai et al.

(10) Patent No.: US 6,609,394 B1
(45) Date of Patent: Aug. 26, 2003

(54) METHOD FOR PRODUCING AIR-QUENCH-TOUGHENED GLASS PLATE

(75) Inventors: Chihiro Sakai, Osaka (JP); Masashi Kikuta, Osaka (JP); Masayuki Maenaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/486,974

(22) PCT Filed: Jul. 6, 1999

(86) PCT No.: PCT/JP99/03631

§ 371 (c)(1),
(2), (4) Date: Mar. 6, 2000

(87) PCT Pub. No.: WO00/01627

PCT Pub. Date: Jan. 13, 2000

(30) Foreign Application Priority Data

Jul. 7, 1998 (JP) .......... 10-191223
Jul. 7, 1998 (JP) .......... 10-191233

(51) Int. Cl.⁷ .............. C03B 27/00
(52) U.S. Cl. .......... 65/29.19; 65/104; 65/114; 65/117
(58) Field of Search .......... 65/104, 114, 117, 65/29.19

(56) References Cited

U.S. PATENT DOCUMENTS 3,776,707 A * 12/1973 Inoue et al. .......... 65/114
5,908,702 A * 6/1999 Mita et al. .......... 501/69
6,103,650 A * 8/2000 Krumwiede .......... 501/71

FOREIGN PATENT DOCUMENTS

| DE | 20 43 942 A | 4/1971 |
| EP | 0 853 069 A | 7/1998 |
| GB | 2324525 | 4/1998 |
| JP | 9-500355 | 1/1997 |

OTHER PUBLICATIONS

PCT International Search Report.

Takao Joubu, "Jiko kaiseki no jissai Glass hahen no yasashii shirabekata", Metals, (1998), vol. 68, No. 11, p. 1028.

European Search Report, Nov. 6, 2001.

\* cited by examiner

Primary Examiner—James Derrington
(74) Attorney, Agent, or Firm—RatnerPrestia

(57) ABSTRACT

In a process for producing an air-quench-toughened glass plate, defective glass plates containing nickel sulfide (NiS) are removed by compulsory breaking the glass plates. Such compulsory breakage is carried out in the course of a batch-manner soaking process carried out after a toughening step; in the course of a toughening step carried out after generation of cracks in an annealing step; in the course of a toughening step carried out after generation of cracks in a pretreatment step; or in the course of a continuous annealing step carried out after a toughening step. Through the method, NiS-free toughened glass plates of high quality can be produced.

7 Claims, 19 Drawing Sheets

METHOD FOR PRODUCING AIR-QUENCH-TOUGHENED GLASS PLATE

TECHNICAL FIELD

The present invention relates to a method for producing an air-quench-toughened glass plate, and more particularly to a method for producing a high-quality air-quench-toughened glass plate including a step for compulsorily breaking toughened glass containing nickel sulfide (NiS), to thereby remove defective products.

BACKGROUND ART

Air-quench-toughened glass (float glass) plates, particularly such plates having a soda-lime composition, have widely been employed as panes in buildings and as side and rear windows of automobiles. In a conventional method for producing soda-lime glass, in a step for melting glass raw materials at a high temperature in the vicinity of near 1,500° C. in a melting furnace, a nickel (Ni) component contained in stainless steel used for the interior of the melting furnace and Ni-containing metal particles (e.g., stainless steel particles) contained as impurities in a glass raw material may be mingled into molten glass, and the Ni component may react with a sulfur (S) component contained in mirabilite ($Na_2SO_4$) serving as a glass raw material. As a result, nickel sulfide (NiS) may be present in a melt-molded glass substrate. The incidence of an NiS impurity in a defective glass product is very low; i.e., the number of impurities is about one in some 10 tons (t) of glass products. In addition, the impurity has a spherical shape and the particle size is as small as 0.3 mm or less, and thus detection of the impurity in a production line is very difficult.

In order to process such substrates formed of soda-lime glass into glass products used in buildings and automobiles, glass substrates are toughened by heating to the softening point of glass (about 620° C.) and quenching to about 450° C. by means of an air-jet (a so-called quenching step), to thereby generate compressive stress (e.g., 100 $kg/cm^2$ or more) in the surfaces of the resultant glass plates. This process is called air-quench toughening.

When nickel sulfide (NiS) is present as an impurity in air-quench-toughened glass which is heated and cooled to ambient temperature in a toughening step, α-phase NiS, which is stable at about 350° C. or higher, is present in an unstable state. Since α-phase NiS is unstable at ambient temperature, with passage of time it is transformed into β-phase NiS, which is stable at ambient temperature. The volume of NiS increases concomitant with phase transformation. A toughened glass plate contains a tensile stress layer having a thickness which is about ⅔ the overall thickness of the plate, and thus cracks (breakage) rapidly grow due to an increase in the volume of NiS in the tensile stress layer, to thereby cause spontaneous breakage of the glass plate.

In recent years, these air-quench-toughened glass plates having a large surface area have predominantly served as a building material, and toughened glass products have had a thickness up to 4–19 mm and considerable weight. Thus, as a measure against spontaneous breakage of toughened glass plates induced by nickel sulfide (NiS) impurities or other glass defects contained in toughened glass plates, protective film formed of an organic material is laminated on either side of a toughened glass plate, to thereby prevent the glass plate from becoming a hazard in the event of breakage.

However, a conventional method including lamination with protective film does not serve as an essential measure for preventing spontaneous breakage of toughened glass plates induced by phase transformation of nickel sulfide (NiS).

In addition to the above-described method, there is known a method for removing defective products containing NiS impurities, which method comprises inserting in a firing (soaking) furnace a toughened glass plate which has been heated during a toughening step and annealed to ambient temperature; heating again to a predetermined temperature (typically 290° C. or higher), and maintaining the temperature for a predetermined time to thereby cause phase transformation of NiS from unstable α phase (α phase is stable at about 350° C. or higher) to β phase, which is stable at 290° C. or higher, concomitant with an about 4% expansion in volume; and compulsorily breaking any NiS-containing, defective toughened glass plate through drastic growth of generated cracks. This method is called a batch-manner soaking process.

In such a batch-manner soaking process, a toughened glass plate containing NiS must be broken, to thereby reliably remove any defective product.

A conventional batch-manner soaking process requires a long time and great amount of thermal energy for elevating temperature, since a toughened glass plate which had once been cooled to ambient temperature is heated again to a predetermined temperature. In addition, the time during which the glass plate must be maintained at a predetermined temperature varies with the thickness of the glass plate, to thereby elevate production cost for glass plates.

Furthermore, in a conventional batch-manner soaking process, the phase transformation of nickel sulfide depends considerably upon the temperature elevation rate. Therefore, a variety of conditions must be investigated so as to determine optimum operational conditions.

In addition, in a conventional batch-manner soaking process, when the composition or thickness of a glass plate during temperature elevation is altered, conditions for causing phase transition of nickel sulfide (predominantly maintenance temperature and time) vary. Thus, removal of all toughened glass products containing nickel sulfide is difficult.

DISCLOSURE OF THE INVENTION

An object of the present invention is to provide a method for producing an air-quench-toughened glass plate including conditions for compulsorily and reliably breaking defective NiS-containing glass during a conventionally-employed batch-manner soaking process.

Another object of the present invention is to provide a method for producing an air-quench-toughened glass plate comprising a continuous-manner soaking process.

Another object of the present invention is to provide a method for producing an air-quench-toughened glass plate comprising compulsorily and reliably breaking defective NiS-containing glass without employing a conventionally-employed batch-manner soaking process.

Still another object of the present invention is to provide an air-quench-toughened glass plate produced through any of the above methods.

According to a first mode of the present invention, there is provided a method for producing a toughened glass plate comprising the steps of:

carrying out air-quench toughening for quenching a glass plate heated to near a softening point thereof to thereby generate compressive stress in the surface layers of the glass plate;

lowering the temperature of the toughened glass plate to ambient temperature; and elevating the temperature of the glass plate from ambient temperature to a predetermined temperature range to thereby cause phase transformation of nickel sulfide (NiS) contained as a molten impurity in the glass plate from α-NiS (α phase) to β-NiS (β phase) concomitant with expansion of the volume thereof, resulting in compulsory breakage of the glass plate to thereby remove defective products, characterized in that the predetermined temperature range and a temperature elevation rate to the range satisfy the following conditions:

when the temperature elevation rate is about 3° C./minute, the predetermined temperature range is 170–320° C.;

when the temperature elevation rate is about 5° C./minute, the predetermined temperature range is 180–320° C.;

when the temperature elevation rate is about 6° C./minute, the predetermined temperature range is 185–325° C.;

when the temperature elevation rate is about 10° C./minute, the predetermined temperature range is 215–340° C.;

when the temperature elevation rate is about 20° C./minute, the predetermined temperature range is 235–345° C.;

when the temperature elevation rate is about 40° C./minute, the predetermined temperature range is 270–350° C.; and when the temperature elevation rate is about 50° C./minute, the predetermined temperature range is 285–350° C.

According to a second mode of the present invention, there is provided a method for producing a toughened glass plate comprising the steps of:

carrying out air-quench toughening for quenching a glass plate heated to near a softening point thereof to thereby generate compressive stress in the surface layers of the glass plate; and in the course of carrying out annealing following the air-quench toughening, maintaining toughened glass containing nickel sulfide (NiS), which causes growth of cracks along with residual thermal stress, at a predetermined temperature for a predetermined time to thereby cause phase transformation of the nickel sulfide (NiS) from α-NiS α phase) to β-NiS (β phase) concomitant with expansion of the volume thereof, resulting in drastic growth of cracks and simultaneous breakage of the glass.

According to a fifth mode of the present invention, there is provided a method for producing a toughened glass plate comprising the steps of:

carrying out air-quench toughening for quenching a glass plate heated to near a softening point thereof to thereby generate compressive stress in the surface layers of the glass plate; and in the course of carrying out annealing following the air-quench toughening, annealing toughened glass containing nickel sulfide (NiS), which causes growth of cracks along with residual thermal stress, at a temperature from near 300° C. to 150–200° C. at a rate of less than 12° C./minute to thereby cause phase transformation of the nickel sulfide (NiS) from α-NiS (α phase) to β-NiS (β phase) concomitant with expansion of the volume thereof, resulting in drastic growth of cracks and simultaneous breakage of the glass.

According to a third mode of the present invention, there is provided a method for producing a toughened glass plate including a production step for a glass plate comprising a melting step, a shaping step, and an annealing step, immediately followed by a toughening step, characterized in that the method comprises the steps of:

in the course of carrying out the annealing step, lowering the temperature of the glass plate to a predetermined temperature range and maintaining the glass plate at a predetermined temperature within the temperature range of 160–280° C. for 6–30 minutes to thereby cause phase transformation of the nickel sulfide (NiS) contained in the glass plate from α-NiS (α phase) to β-NiS (β phase) concomitant with expansion of the volume thereof, which generates cracking around nickel sulfide particles; and in a toughening step following the annealing step, quenching the glass plate from near the softening point thereof to thereby generate compressive stress in the surface layers of the glass plate and, subsequently, causing drastic growth of cracks to thereby compulsorily cause breakage the glass plate so as to remove defective products.

According to a fourth mode of the present invention, there is provided a method for producing a toughened glass plate including a production step for a glass plate, immediately followed by a toughening step, characterized in that the method comprises the steps of:

in the course of carrying out a pretreatment step prior to the toughening step, heating the glass plate to thereby cause phase transformation of the nickel sulfide (NiS) contained in the glass plate from α-NiS (α phase) to β-NiS (β phase) concomitant with expansion of the volume thereof, which generates cracking around nickel sulfide particles; and in a toughening step following the pretreating step, quenching the glass plate from near the softening point thereof to thereby generate compressive stress in the surface layers of the glass plate and, subsequently, causing drastic growth in cracks to thereby compulsorily cause breakage of the glass plate so as to remove defective products, and the predetermined temperature range and the temperature elevation rate to the range employed in the pretreatment step satisfy any one of the following conditions:

when the temperature elevation rate is about 3° C./minute, the predetermined temperature range is 170–320° C.;

when the temperature elevation rate is about 5° C./minute, the predetermined temperature range is 180–320° C.;

when the temperature elevation rate is about 6° C./minute, the predetermined temperature range is 185–325° C.;

when the temperature elevation rate is about 10° C./minute, the predetermined temperature range is 215–340° C.;

when the temperature elevation rate is about 20° C./minute, the predetermined temperature range is 235–345° C.;

when the temperature elevation rate is about 40° C./minute, the predetermined temperature range is 270–350° C.; and when the temperature elevation rate is about 50° C./minute, the predetermined temperature range is 285–350° C.

BEST MODES FOR CARRYING OUT THE INVENTION

EXAMPLE 1

In Example 1, there are provided optimum conditions for reliably and compulsorily breaking defective glass plates containing NiS in the course of a conventional batch-manner soaking process.

Figure 1:
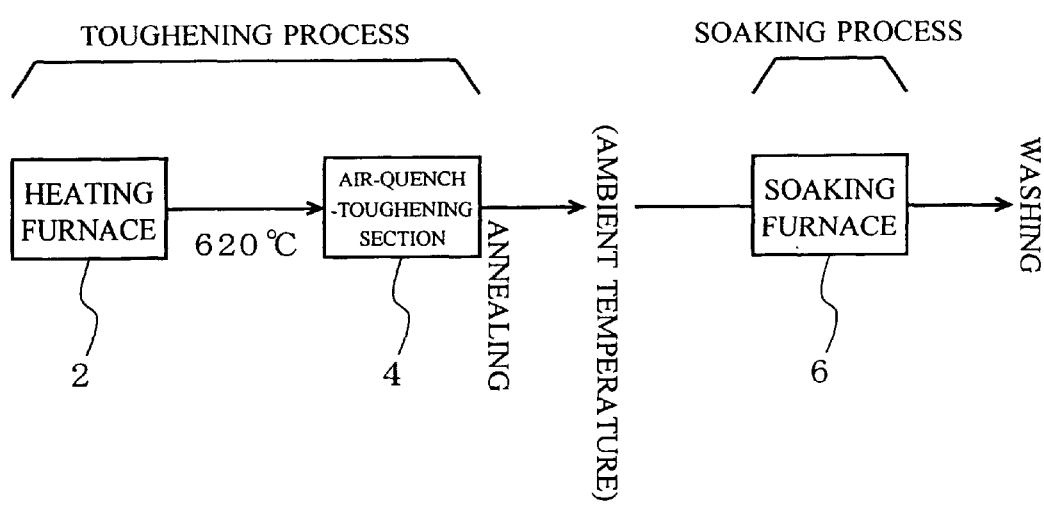
FIG. 1 is a flow chart of steps for producing a toughened glass plate including a batch-manner soaking process carried out in Example 1.

FIG. 1 shows a method for producing a toughened glass plate including a batch-manner soaking process in Example 1. In this method for producing the plate, a glass plate is conveyed from a heating furnace 2 at about 620° C., and the glass plate heated to a temperature near the softening point thereof is quenched to about 450° C. in an air-quench-toughening portion 4. Quenching induces compressive stress in the surfaces of glass plate, to thereby form a toughened glass plate. The thus-air-quench-toughened glass plate is annealed to ambient temperature. Subsequently, the toughened glass plate at ambient temperature is transferred into a soaking furnace 6, and the temperature in the furnace is elevated to a predetermined temperature range at a predetermined temperature elevation rate. When the toughened glass plate contains α-NiS (α phase), the α-NiS (α phase) undergoes phase transformation to β-NiS (β phase). Due to phase transformation, NiS undergoes volume expansion by about 4%, to thereby induce breakage of the glass plate containing α-NiS (α phase). Unbroken glass plates are passed through a washing machine and collected at a pick-up portion as final products, and then transferred to the subsequent step.

In Example 1, in order to set in advance a preferred temperature elevation rate and temperature range employed during a soaking process, the following processes were carried out.

By means of a practically-employed float-melting furnace, glass plates containing nickel sulfide (NiS) having a particle size of 0.3 mm or less were produced. The plates are designated as 1 to 4. The following Table 1 shows the composition and thickness of each glass plate.

TABLE 1

| Sample No. | Composition (wt. %) | Sheet thickness | Color |
|---|---|---|---|
| 1 | $SiO_2$: 71–73, $Al_2O_3$: 1.5–1.8, MgO: 4–4.5, CaO: 8–10, $Na_2O$: 13–14, $K_2O$: 0.5–1.5, $Fe_2O_3$: 0.02–0.05, $SO_3$: 0.1–0.5, | 12 mm | Colorless |
| 2 | The amount of $Fe_2O_3$ in Sample 1 is adjusted to 0.01–0.6, to thereby serve as a coloring component. | 12 mm | Pale blue |
| 3 | The amount of $Fe_2O_3$ in Sample 1 is adjusted to 0.06–0.2, and a microamount of Se is added. | 10 mm | Pale brown |
| 4 | A microamount of Ce is further added to Sample 2. | 4 mm | Green |

Glass plate sample 1 has a composition as shown in Table 1 and has a plate thickness of 12 mm and no color. Glass plate sample 2 has an $Fe_2O_3$ composition which is altered from that in Glass plate sample 1 to 0.01–0.6 wt. % so as to cause $Fe_2O_3$ to serve as a coloring component, and has a plate thickness of 12 mm and a pale blue color. Glass plate sample 3 has an $Fe_2O_3$ composition which is altered from that in Glass plate sample 1 to 0.06–0.2 wt. %, and a very small amount (or microamount) of Se serving as a coloring component is added therein. Glass plate sample 3 has a plate thickness of 10 mm and a pale brown color. Glass plate sample 4 is produced from Glass plate sample 2 by adding a microamount of Ce as an additive, and has a thickness of 4 mm and a green color.

Each glass plate sample was polished so as to have a thickness of about 3 mm, and placed in a microscope which can elevate the temperature to 500° C. (hereinafter referred to as a high-temperature microscope). The temperature and time for completing phase transformation from α phase to complete β phase via incomplete β phase were investigated through in situ observation of transformation of NiS from α phase to β phase in steps having different temperature elevation rates.

The term "incomplete β phase" refers to a state in which β phase is gradually formed from α phase. Since NiS is formed of a polycrystalline body, the region in which stable β phase is attained is defined as that region where the entirety of the crystal phase has been transformed to β phase.

Phase transformation from α phase to β phase was confirmed under a high-temperature microscope, by observing generation and intensity of residual stress formed due to compression of glass surrounding nickel sulfide (NiS) concomitant with increases in volume during phase transformation to β phase, with a polarizing plate being in a cross-Nicol state and a 530 µm high-sensitive color detection plate being inserted. The state of complete transformation to β phase was judged from a point at which the compressive stress reached a maximum (i.e., a point at which retardation reached a maximum as observed under a high-temperature microscope).

On the basis of the measurement as described above, a method for determining conditions employed in the soaking process will next be described.

A graph having one axis indicating the temperature and the other axis indicating the time was employed. The temperature elevation rate was selected, and points of phase transformation of nickel sulfide (NiS) from α phase to β phase were plotted on the graph at predetermined points in time. The procedure was repeated many times for different combinations of sample glass and/or temperature elevation rates. After completion of repetition, plots in the interface between incomplete β phase and complete β phase were connected to thereby draw a phase transformation curve. Thus, the temperature range and temperature elevation rate were determined from a region in the vicinity of the phase transformation curve and in which NiS exhibits complete β phase.

Figure 2:
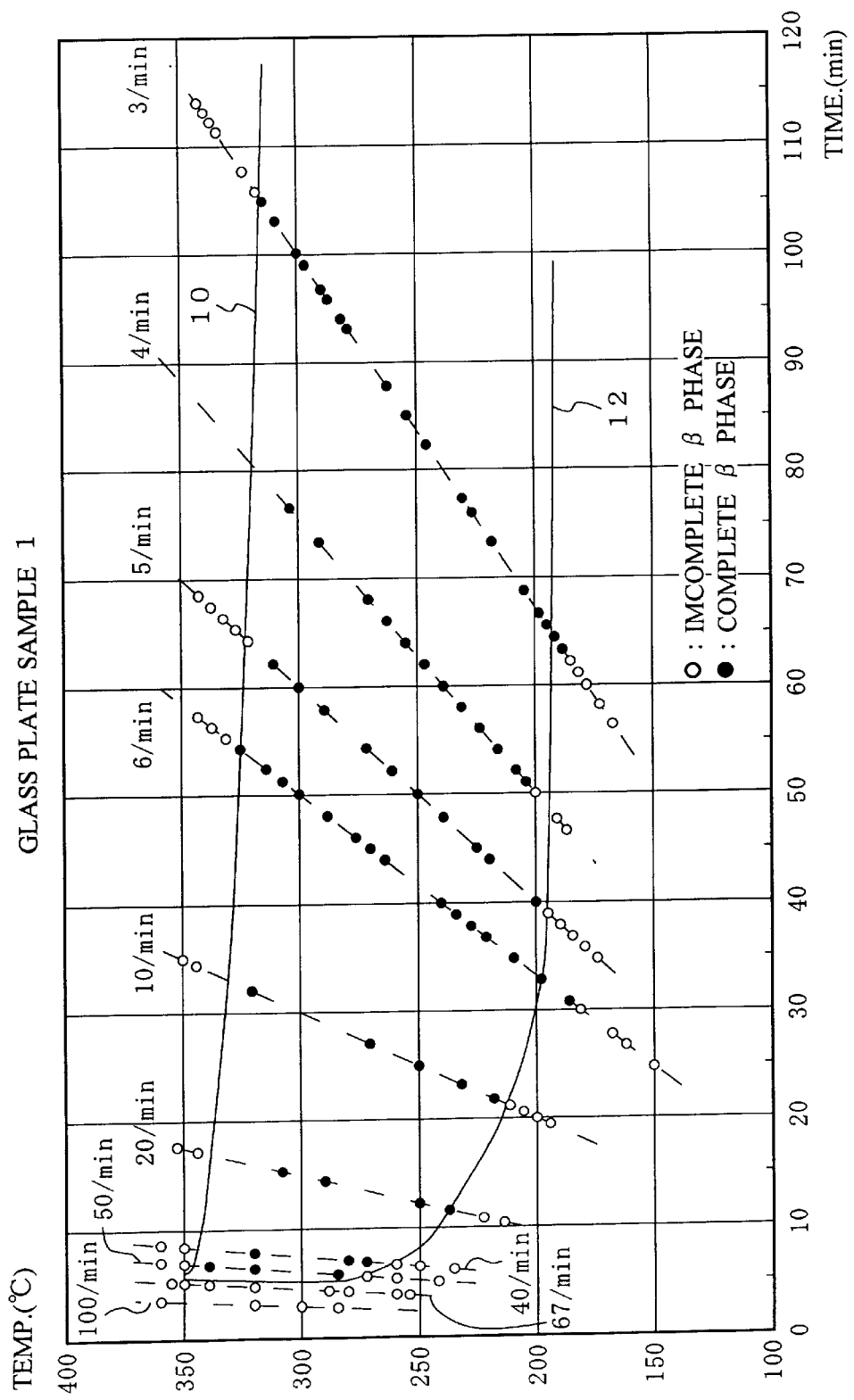
FIG. 2 is a graph showing relationships among temperature maintenance time, temperature, and phase transformation investigated by use of Glass plate sample 1.
Figure 3:
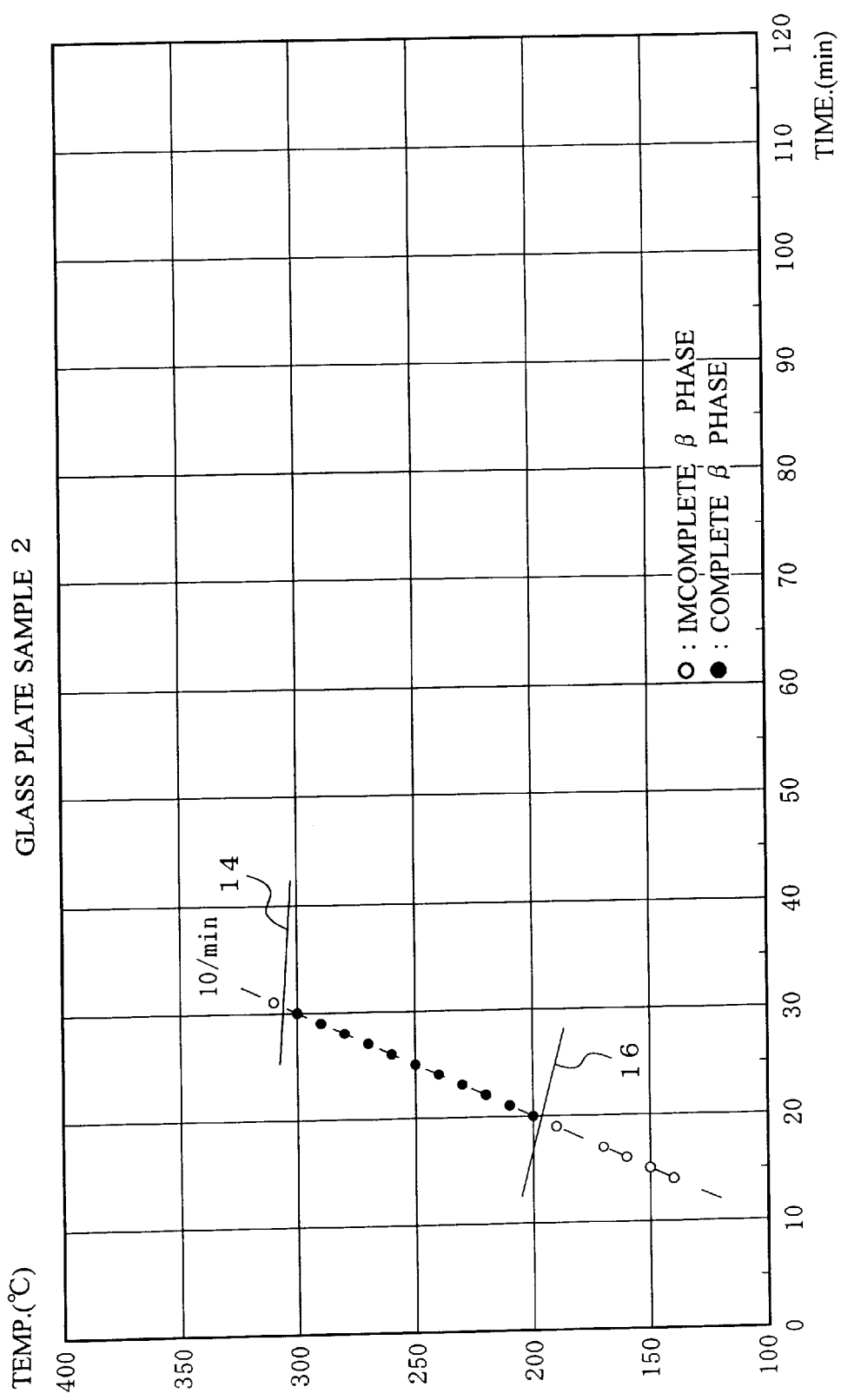
FIG. 3 is a graph showing relationships among temperature maintenance time, temperature, and phase transformation investigated by use of Glass plate sample 2.
Figure 4:
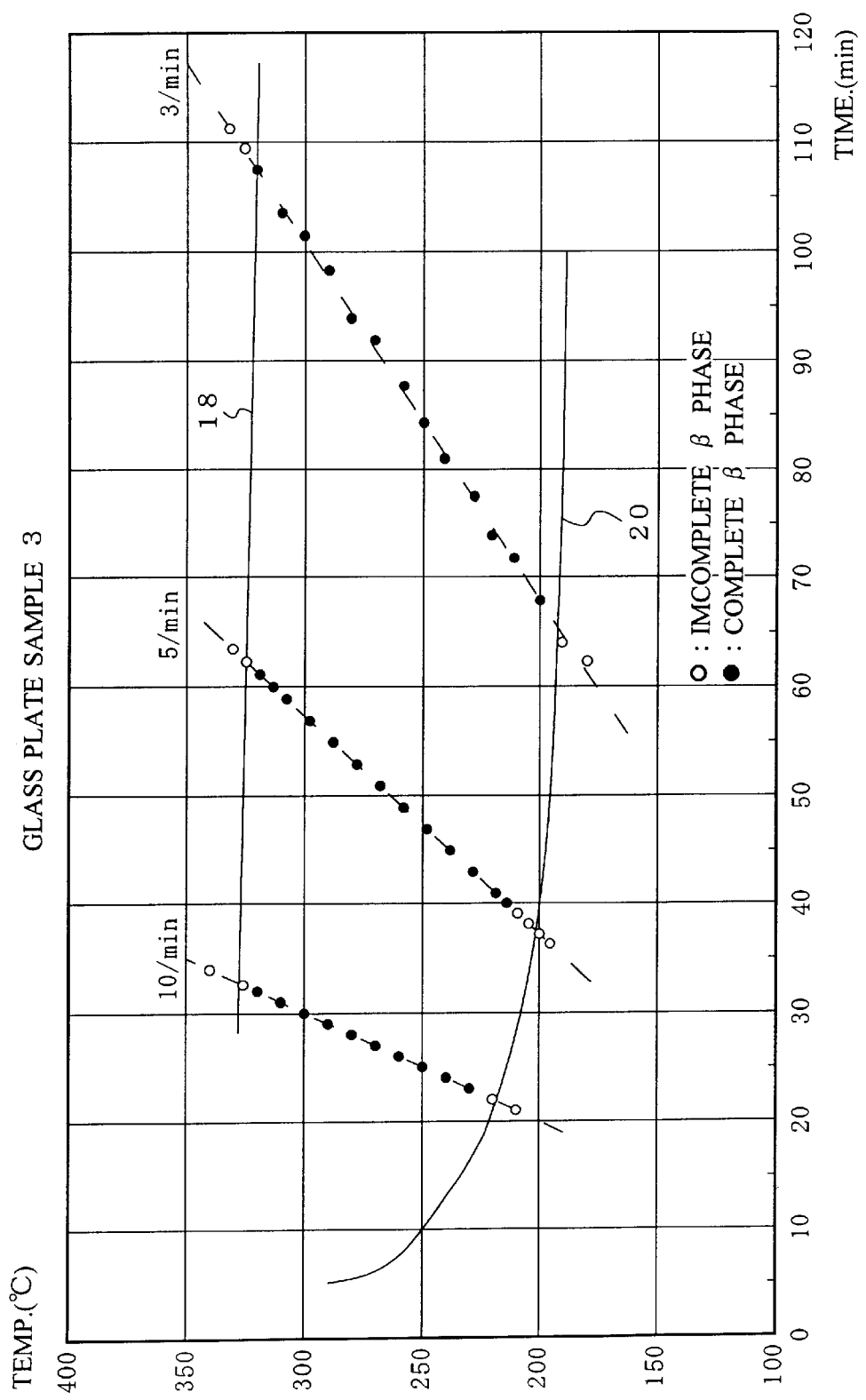
FIG. 4 is a graph showing relationships among temperature maintenance time, temperature, and phase transformation investigated by use of Glass plate sample 3.

FIGS. 2 to 4 are graphs showing relationships including the temperature, temperature elevation rates, time, and phase transformation for each of the glass samples. In each graph, the Y-axis indicates temperature and the X-axis indicates time.

FIG. 2 is a graph including plots of points showing complete transformation from α phase to β phase in Glass plate sample 1 at a variety of temperature elevation rates.

FIG. 3 is a graph including plots of points showing complete transformation from α phase to β phase in Glass plate sample 2 at a temperature elevation rate of 10° C./minute.

FIG. 4 is a graph including plots of points showing complete transformation from α phase to β phase in Glass plate sample 3 at temperature elevation rates of 3° C./minute, 5° C./minute, and 10° C./minute.

Figure 5:
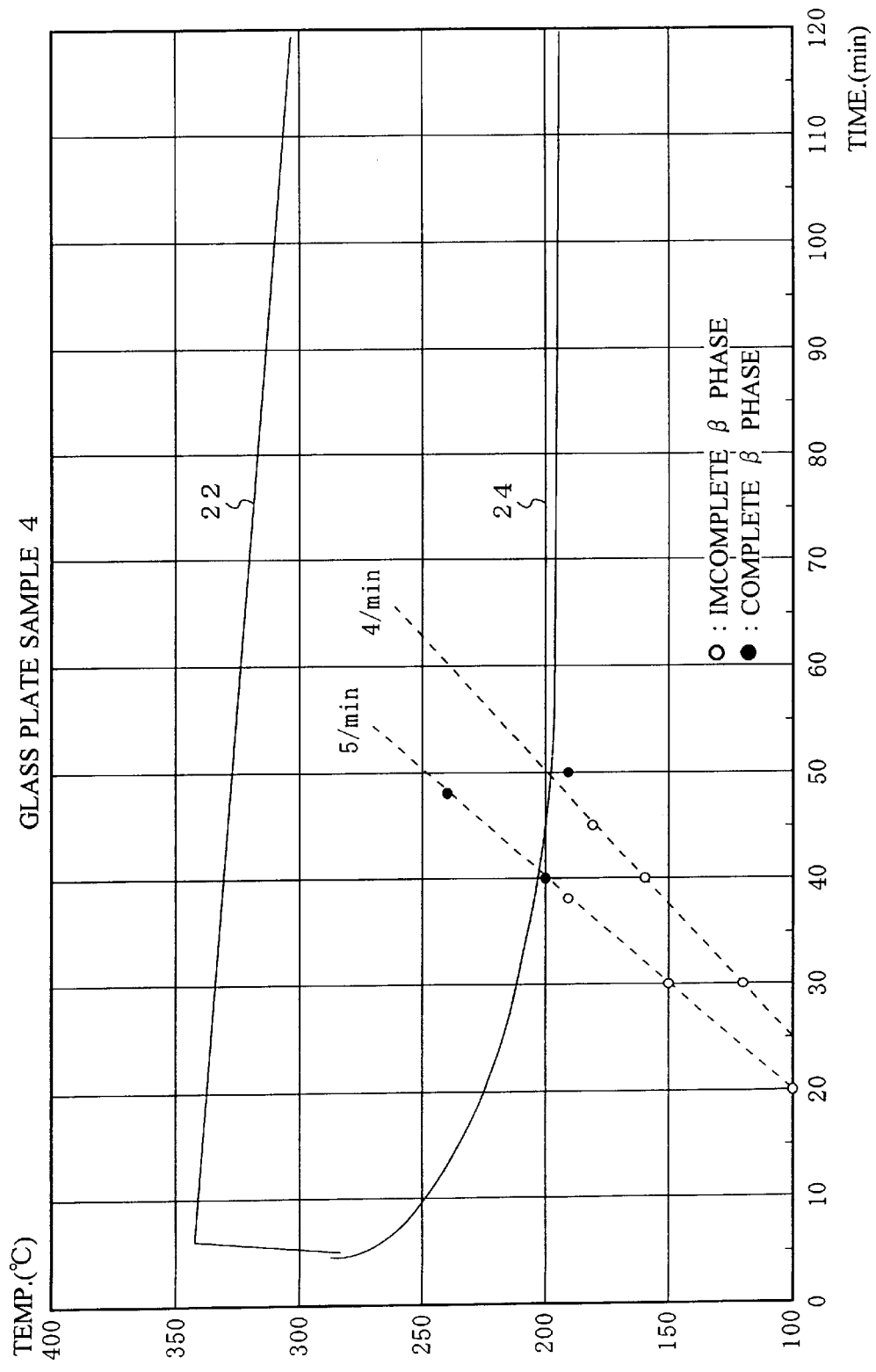
FIG. 5 is a graph showing relationships among temperature maintenance time, temperature, and phase transformation investigated by use of Glass plate sample 4.

FIG. 5 is a graph including plots of points showing complete transformation from α phase to β phase in Glass plate sample 4 at temperature elevation rates of 4° C./minute and 5° C./minute.

In each figure, the symbol "O" indicates incomplete β phase and the symbol "•" indicates complete β phase. Plots in an interface between an incomplete β phase and a complete β phase were connected so as to draw phase transformation curves. In FIG. 2, the phase transition curves are represented by 10 and 12. In FIG. 3, the phase transition curves are represented by 14 and 16. In FIG. 4, the phase transition curves are represented by 18 and 20. In FIG. 5, the phase transition curves are represented by 22 and 24.

As is clear from FIGS. 2 to 5, the following temperature elevation rates and temperature ranges are provided so as to induce phase transformation from α phase to β phase of NiS contained in glass at room temperature:

Temperature elevation rate of 3° C./minute (Temperature range of 170–320° C.);

Temperature elevation rate of 5° C./minute (Temperature range of 180–320° C.);

Temperature elevation rate of 6° C./minute (Temperature range of 185–325° C.);

Temperature elevation rate of 10° C./minute (Temperature range of 215–340° C.);

Temperature elevation rate of 20° C./minute (Temperature range of 235–345° C.);

Temperature elevation rate of 40° C./minute (Temperature range of 270–350° C.); and Temperature elevation rate of 50° C./minute (Temperature range of 285–350° C.).

The above conditions for temperature elevation rate and temperature range are temperature and time conditions for nickel sulfide (NiS) particles themselves. When a toughened glass plate is used, the temperature elevating conditions may vary depending on the thickness of the glass plate. Thus, conditions of a soaking furnace are preferably regulated in accordance with time-dependent change in temperature of the surfaces of a glass plate.

Therefore, in addition to the aforementioned conditions for temperature elevation rate and temperature range, toughened glass is preferably maintained at an arbitrary temperature within the aforementioned temperature range for a specific period of time within 5–60 minutes, depending on the performance of a furnace employed in a soaking process.

When toughened glass which is subjected to a soaking process is colored glass containing ferric oxide ($Fe_2O_3$) in an amount of 0.01–0.6 wt. %, defective products of toughened glass containing nickel sulfide (NiS) can be removed by satisfying the aforementioned conditions for temperature elevation rate and temperature range. However, the glass is preferably maintained within the aforementioned temperature range for a specific period of time within 5–60 minutes, due to variation in the temperature elevation rate of glass per se attributable to differences in the plate thickness of the glass.

When toughened glass which is subjected to a soaking process is colored glass containing a microamount of selenium (Se), the temperature elevation rate is preferably 3° C./minute (temperature range of 170–320° C.) or less so as to complete phase transformation of the total amount of nickel sulfide, in consideration of formation of a solid solution of selenium (Se) in NiS. As in the case in which glass contains ferric oxide ($Fe_2O_3$), the glass is preferably maintained within the aforementioned temperature range for a specific period of time within 5–60 minutes, depending on the plate thickness.

Similarly, when toughened glass which is subjected to a soaking process is colored glass containing a microamount of cerium (Ce), the temperature elevation rate is preferably 3° C./minute or less so as to complete phase transformation of the total amount of nickel sulfide.

The procedure of steps including a soaking process for producing a toughened glass plate will be described with reference to FIG. 1.

A glass plate is conveyed into the heating furnace 2 and heated to about 620° C.; i.e., near the softening point. While the temperature is maintained at 620° C., the glass plate is conveyed from the heating furnace 2 to the air-quench toughening portion 4, and quenched to about 450° C. Quenching induces compressive stress in the surfaces of the glass plate, to thereby form a toughened glass plate. The air-quench-toughened glass plate is annealed to ambient temperature. Subsequently, the toughened glass plate of ambient temperature is transferred into the soaking furnace 6, and the temperature in the furnace is elevated to said predetermined temperature range at said predetermined temperature elevation rate. When the toughened glass plate contains α-NiS (α phase), the NiS undergoes phase transformation from α phase to stable β phase via unstable β phase. Due to phase transformation from α phase to β phase, the volume of nickel sulfide (NiS) increases to thereby induce cracking in the glass from an interface between a nickel sulfide (NiS) particle and the glass in a direction normal to a circumferential direction. As a result, drastic and spontaneous breakage of the glass occurs, to thereby completely remove defective glass products containing nickel sulfide (NiS).

As described above, in the method for producing toughened glass according to Example 1 including completing phase transformation of nickel sulfide (NiS) contained in a glass plate from α phase to β phase and forcing the glass plate to break due to an increase in the volume of NiS induced by phase transformation, a graph showing a phase transformation curve with respect to temperature and time axes is drawn for each kind of glass plate in advance, and on such a graph, the maintenance temperature and temperature elevation rate are selected from the region in the graph near the phase transformation curve and in which NiS assumes β phase. Thus, transformation of α-NiS (α phase) to β-NiS (β phase) can be performed for a minimum required maintenance time, to thereby remove defective glass plates and to attain quality enhancement and cost reduction simultaneously.

EXAMPLE 2

In Example 2, a method for producing air-quench-toughened glass including a continuous soaking process was carried out.

Figure 6:
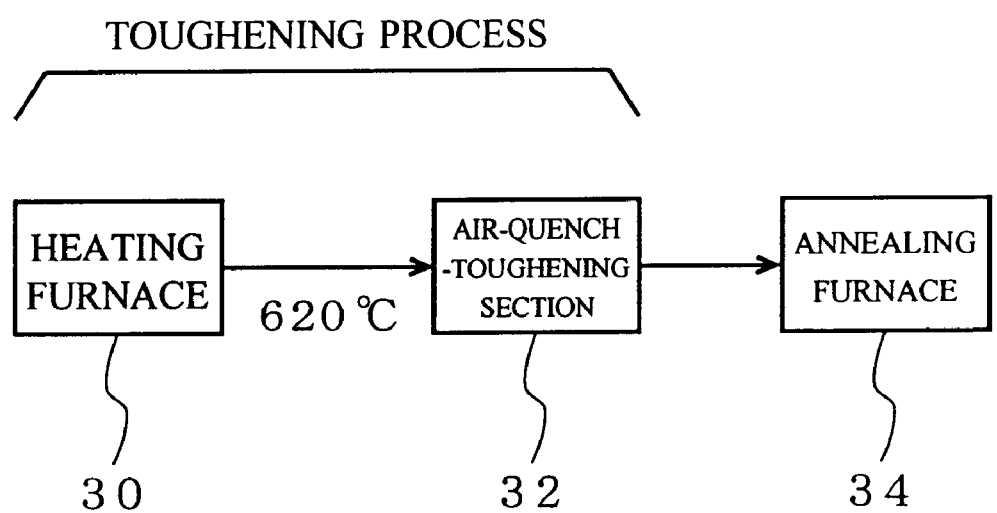
FIG. 6 is a flow chart showing steps for producing a toughened glass plate carried out in Example 2.

FIG. 6 is a chart showing production steps thereof. In the production steps, a glass plate is conveyed at about 620° C. from a heating furnace 30 for toughening, and the glass plate heated to a temperature near the softening point thereof is rapidly cooled (quenched) to about 450° C. in an air-quench toughening portion 32. Subsequently, the plate is maintained in an annealing furnace 34, which is disposed immediately downstream of the air-quench toughening portion 32, at a predetermined temperature for a predetermined time. If the glass plate contains nickel sulfide, nickel sulfide undergoes phase transformation to β phase to thereby break glass while temperature is maintained.

In order to determine in advance the maintenance temperature and time employed in an annealing step after completion of quenching, the following processes were carried out sequentially so as to obtain preferred maintenance temperature and time.

(1) Preparation of Samples and Test for Thermal Treatment

Nickel sulfide particles which were subjected to a test for thermal treatment are those which are typically added into a glass plate during production thereof. Through use of an electron probe microanalyzer (EPMA), these nickel sulfide-derived impurities were confirmed to have a composition including nickel sulfide.

Phase transformation of nickel sulfide was investigated by use of glass plates (about 10 mm in thickness) containing these particles. Each plate was ground so as to have a thickness of about 3 mm and placed in a high-temperature microscope which can elevate temperature to 500° C.

(2) Investigation of Phase Transformation

Each of the aforementioned glass plate samples containing nickel sulfide was heated from room temperature to 350° C. at a temperature elevation rate of 70° C./minute or more, and maintained at 350° C. for 10 minutes or more, to thereby form stable α phase in the glass.

Subsequently, the plate was cooled at a cooling rate of about 50° C./minute (model step of quenching). When the temperature reached a temperature described below, the plate was maintained at the temperature for a predetermined time. The phase transformation to β phase was investigated through in situ observation under a high-temperature microscope.

Phase transformation from α phase to β phase was confirmed by continuously observing generation of residual stress arising due to compression of glass surrounding nickel sulfide (NiS) concomitant with a 4% increase in volume during phase transformation to β phase as manifested in the form of a change in degree of retardation, with a polarizing plate being in a cross-Nicol state and a 530 μm high-sensitive color detection plate being inserted at a diagonal position.

The state of complete transformation to β phase was judged from a point at which the compressive stress reached a maximum (i.e., a point at which retardation reached a maximum as observed under a high-temperature microscope).

Table 2 shows characteristics of Glass plate samples 1 to 6 which were used in the investigation. Glass plate samples 1, 2, and 3 have a composition containing $SiO_2$, $Al_2O_3$, MgO, CaO, $Na_2O$, $K_2O$, $Fe_2O_3$, and $SO_3$ in the amounts shown in Table 2. Glass plate sample 4 further contains $Fe_2O_3$ as a coloring component. Glass plate sample 5 further contains a very small amount (or microamount) of Se. Glass plate sample 6 further contains a microamount of Ce as an additive to sample 4.

TABLE 2

| Sample No. | Composition (wt. %) | Sheet thickness | Color |
|---|---|---|---|
| 1 | $SiO_2$: 71–73, $Al_2O_3$: 1.5–1.8, MgO: 4–4.5, CaO: 8–10, $Na_2O$: 13–14, $K_2O$: 0.5–1.5, $Fe_2O_3$: 0.02–0.05, $SO_3$: 0.1–0.5, | 12 mm | Colorless |
| 2 | The same above | 12 mm | Colorless |
| 3 | The same above | 12 mm | Colorless |
| 4 | The amount of $Fe_2O_3$ in Sample 1 is adjusted to 0.01–0.1, to thereby serve as a coloring component. | 12 mm | Pale Blue |
| 5 | The amount of $Fe_2O_3$ in Sample 1 is adjusted to 0.06–0.2, and a microamount of Se is added. | 7 mm | Pale brown |
| 6 | A microamount of Ce is further added to Sample 2. | 4 mm | Green |

EXPERIMENT EXAMPLE 1

Figure 7:
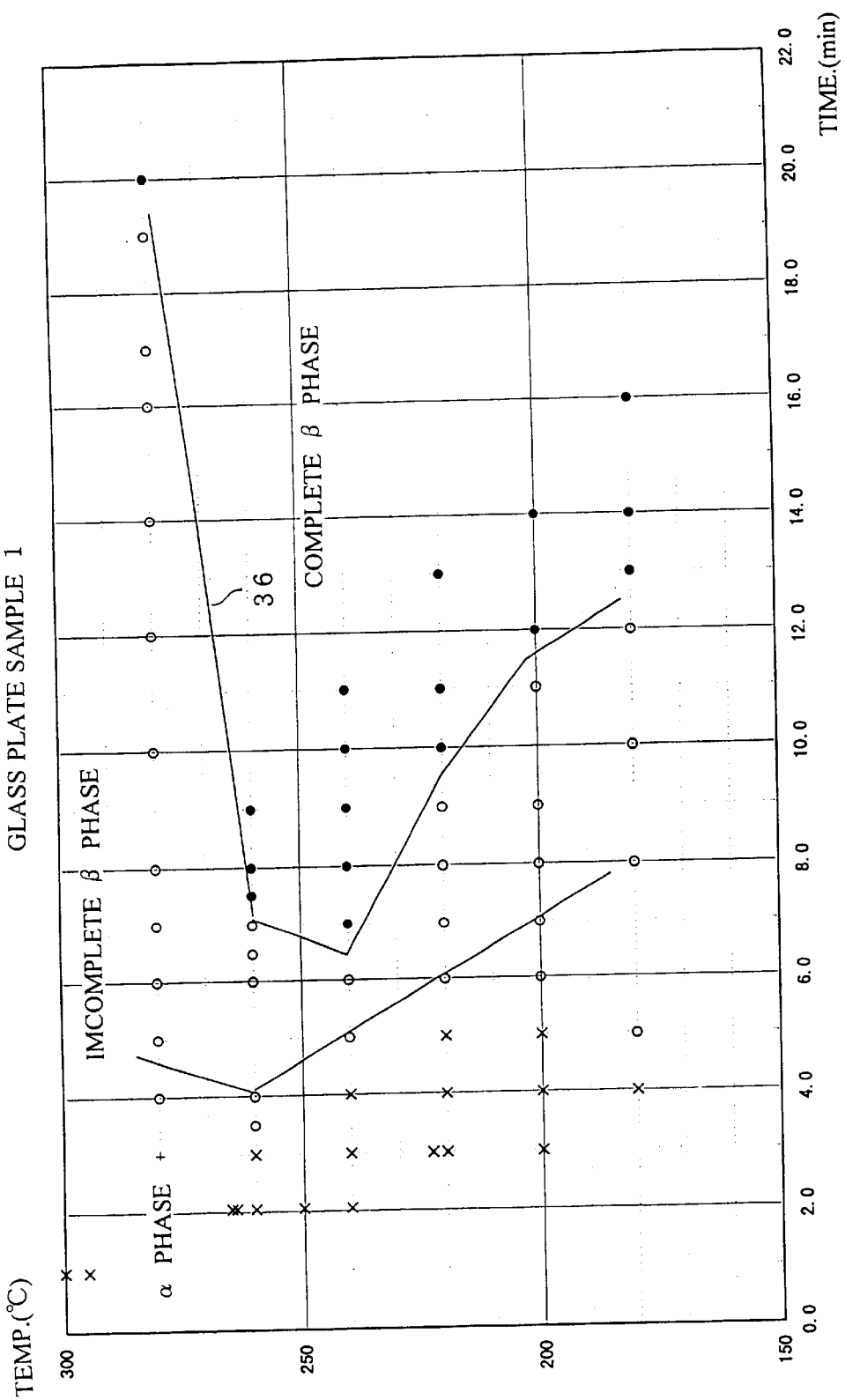
FIG. 7 is a graph showing temperature versus time relationships for causing phase transformation from α phase to β phase in Test Example 1.

FIG. 7 is a coordinate system showing experimental results of phase transformation induced in Glass plate sample 1. In FIG. 7, the X-axis indicates temperature maintenance time (minutes) and the Y-axis indicates maintenance temperature (° C.). In FIG. 7, the symbol "X" indicates nickel sulfide α phase, the symbol "O" indicates incomplete β phase, and the symbol "•" indicates complete β phase.

From the coordinate system, the following temperatures and times for maintaining nickel sulfide so as to cause transformation from stable α phase to complete β phase were deduced:

280° C. (maintenance for at least 20 minutes);
260° C. (maintenance for at least 7 minutes);
240° C. (maintenance for at least 6.5 minutes);
220° C. (maintenance for at least 9 minutes);
200° C. (maintenance for at least 11 minutes);
180° C. (maintenance for at least 13 minutes); and
160° C. (maintenance for at least 15 minutes).

Although the above temperature conditions are discrete, the temperature and time may be arbitrarily selected from conditions appearing in the coordinate system shown in FIG. 7, so long as they are included in a region formed by a curve 36 in which complete β phase is present.

EXPERIMENT EXAMPLE 2

Glass plate sample 2 was thermally treated under the same conditions as employed in Experiment Example 1 and subjected to a similar test. Results of measurement of conditions for phase transition from α phase to β phase are shown in FIG. 8.

EXPERIMENT EXAMPLE 3

Glass plate sample 3 was thermally treated under the same conditions as employed in Experiment Example 1 and subjected to a similar test. Results of measurement of conditions for phase transition from α phase to β phase are shown in FIG. 9.

Figure 8:
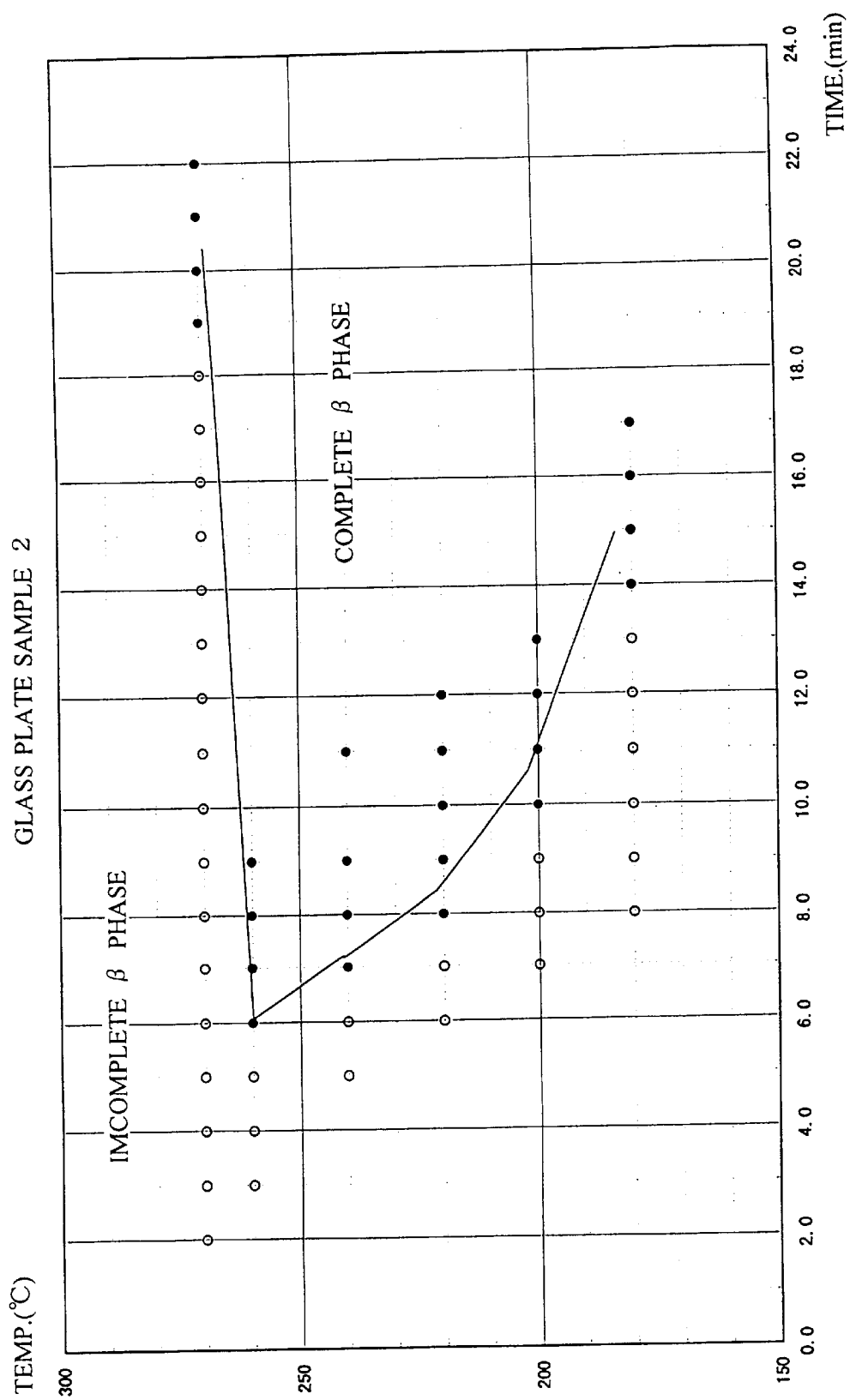
FIG. 8 is a graph showing temperature versus time relationships for causing phase transformation from α phase to β phase in Test Example 2.
Figure 9:
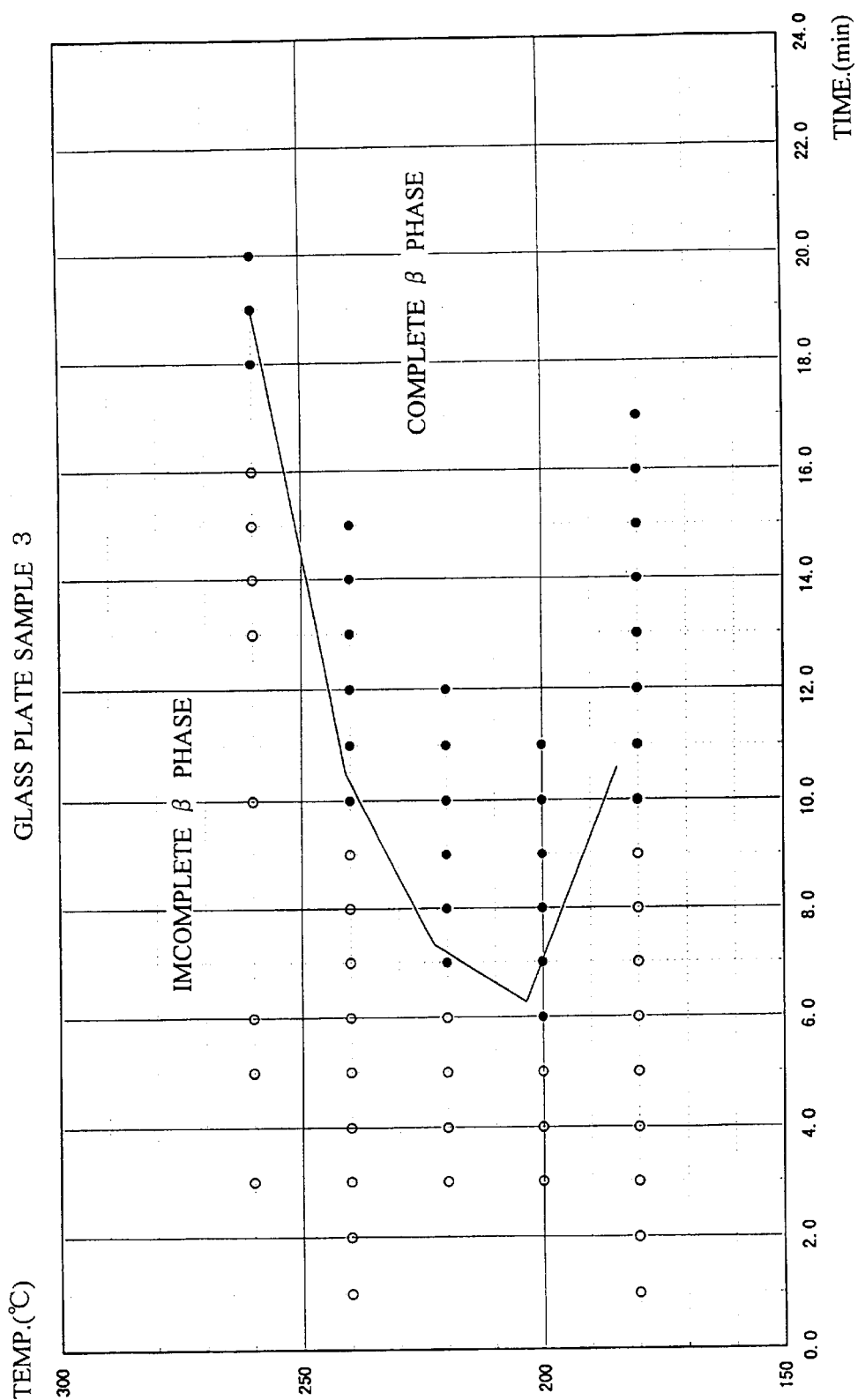
FIG. 9 is a graph showing temperature versus time relationships for causing phase transformation from α phase to β phase in Test Example 3.

As is clear from the results shown in FIGS. 7 to 9, α phase can be substantially completely transformed into stable β phase if samples are maintained at 160–260° C. for 7–20 minutes.

EXPERIMENT EXAMPLE 4

Figure 10:
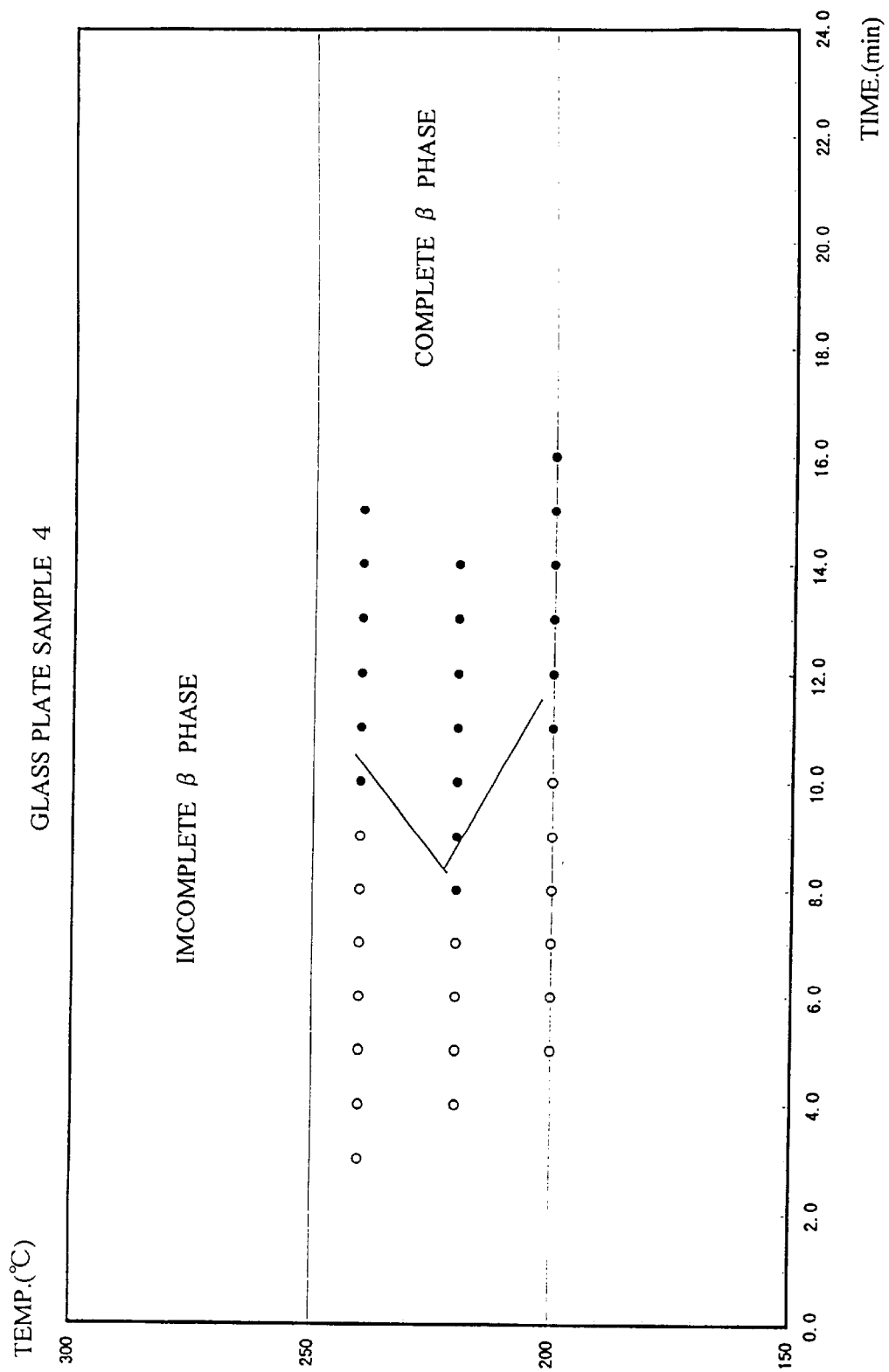
FIG. 10 is a graph showing temperature versus time relationships for causing phase transformation from α phase to β phase in Test Example 4.

Pale-blue-colored Glass plate sample 4 was thermally treated under the same conditions as employed in Experiment Example 1 and subjected to a test. Results of investigation of conditions for phase transition to β phase are shown in FIG. 10.

EXPERIMENT EXAMPLE 5

Figure 11:
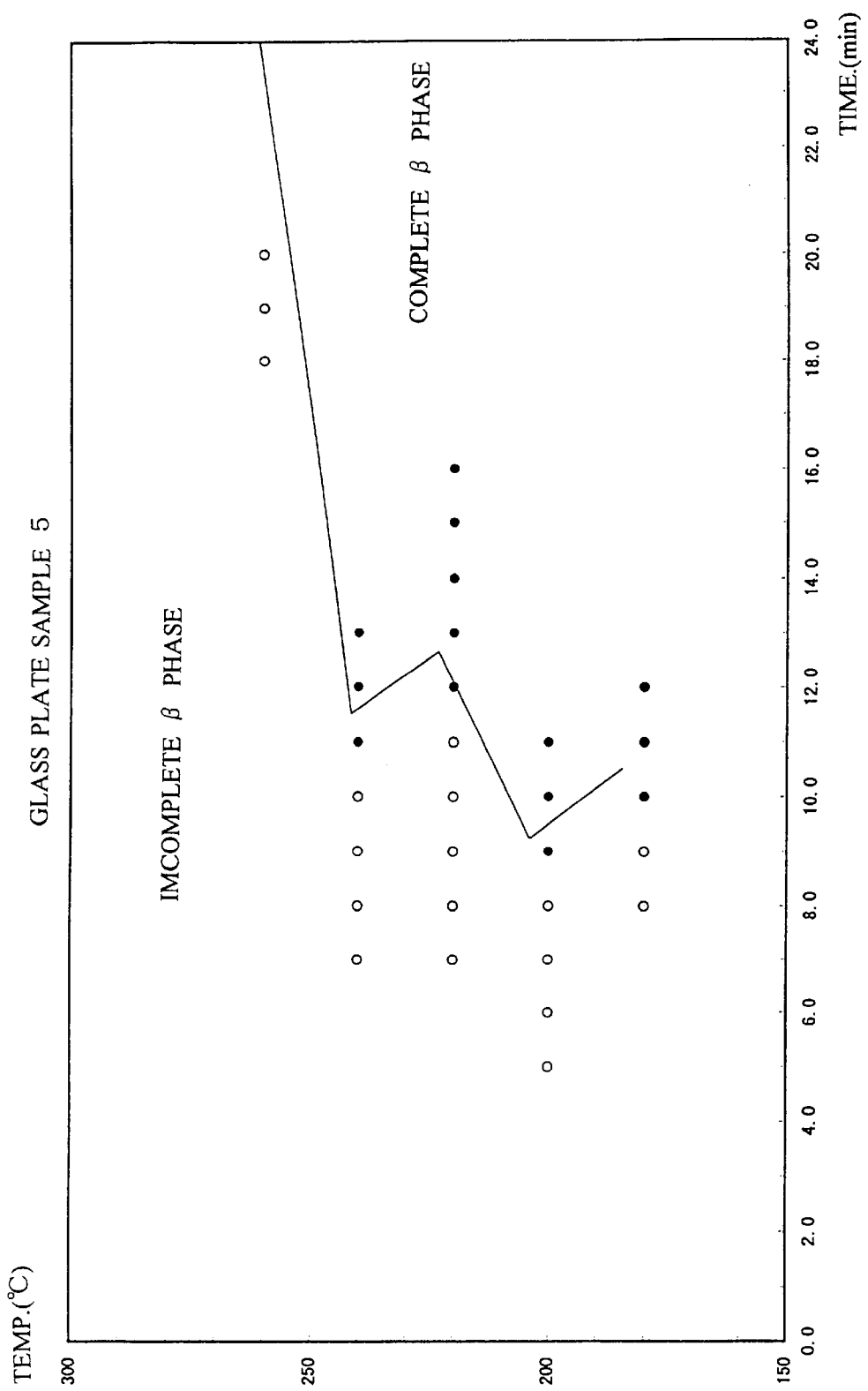
FIG. 11 is a graph showing temperature versus time relationships for causing phase transformation from α phase to β phase in Test Example 5.

Pale-brown-colored Glass plate sample 5 was thermally treated under the same conditions as employed in Experiment Example 1 and subjected to a test. Results of investigation of conditions for phase transition to β phase are shown in FIG. 11.

Figure 12:
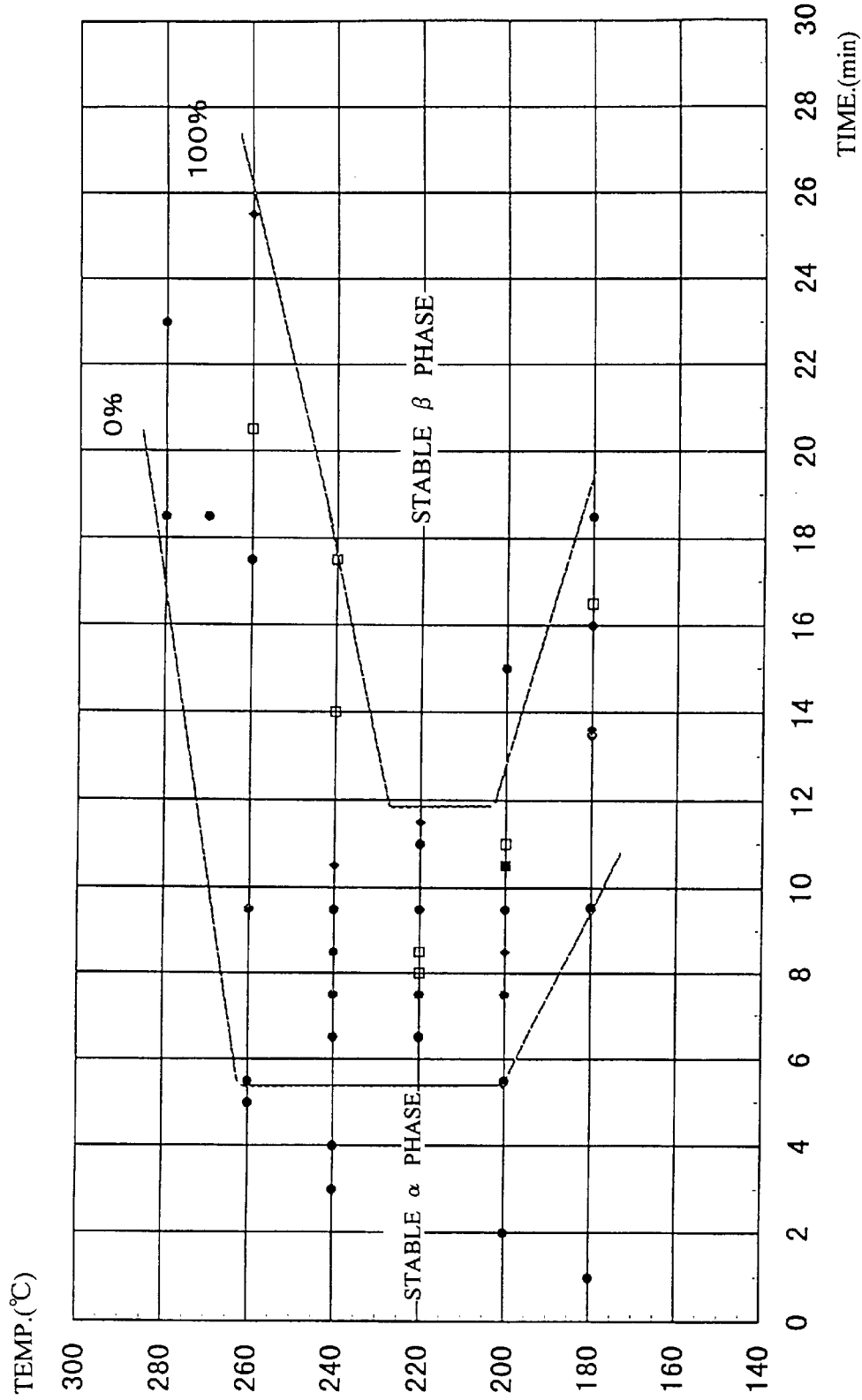
FIG. 12 is a graph showing temperature versus time relationships for causing phase transformation from α phase to β phase during maintenance at a predetermined temperature.

FIG. 12 shows a region in which transformation to stable β phase can be attained in all Glass plate samples 1 to 5. From FIG. 12, maintenance at 160–260° C. for 12–30 minutes is preferred.

As described above, maintenance temperature and temperature-maintenance time conditions for treating nickel sulfide so as to cause transformation from α phase to β phase in a post-quenching annealing step have been determined.

In order to produce air-quench-toughened glass which is not prone to breakage caused by molten impurities such as nickel sulfide in Example 2, steps of the following sequence are preferably employed:

(1) air-quench toughening; (2) quenching; (3) maintaining at 160–280° C. for a predetermined time, to thereby cause transformation of nickel sulfide to stable β phase which results in breakage of glass; and (4) cooling.

According to the procedure, a sample is maintained at 160–280° C. for a predetermined time in a post-quenching annealing step, to thereby cause transformation of nickel sulfide to stable β phase, which results in breakage of toughened glass. Subsequently, a soaking process is carried out.

EXAMPLE 3

In Example 3, a method for producing air-quench-toughened glass including a continuous soaking process was carried out. Controlling of temperature in the annealing furnace 34 during a step shown in FIG. 6 was carried out in a manner different from that employed in Example 2.

In the production steps, a glass plate was conveyed at about 620° C. from the heating furnace 30, and the glass plate heated to a temperature near the softening point thereof was rapidly cooled (quenched) in the air-quench toughening portion 32 to about 450° C., to thereby form a toughened layer in the surface portions of the glass plate. In this case, nickel sulfide is in a stable α phase state.

Subsequently, the plate was continuously annealed from about 300° C. in the annealing furnace 34. Annealing was carried out at a predetermined cooling rate and to a predetermined temperature. If the glass plate contains nickel sulfide, nickel sulfide undergoes phase transformation from α phase to β phase concomitant with expansion in volume to thereby break glass during the maintenance of temperature.

In order to determine in advance the maintenance temperature and temperature-maintenance time employed in an annealing step after completion of quenching, the following processes were carried out sequentially so as to obtain preferred maintenance temperature and temperature-maintenance time.

(1) Preparation of Samples and Thermal Treatment Experiments

Nickel sulfide particles which were subjected to an experiment for the thermal treatment are those which are typically added into a glass plate during production of glass plates. Through use of an electron probe microanalyzer (EPMA), these nickel sulfide-derived impurities were confirmed to have a composition including nickel sulfide.

Phase transformation of nickel sulfide was investigated by use of glass plate samples 1 to 8 (about 10 mm in thickness) containing these particles. Each plate sample was ground so as to have a thickness of about 3 mm and placed in a high-temperature microscope which can elevate temperature to 500° C.

TABLE 3 shows the compositions (wt. %) of the samples

| Sample No. | Composition (wt. %) | Plate thickness |
|---|---|---|
| 1–8 | $SiO_2$: 71–73<br>$Al_2O_3$: 1.5–1.8<br>$MgO$: 4.0–4.5<br>$CaO$: 8–10<br>$Na_2O$: 13–14<br>$K_2O$: 0.5–1.5<br>$Fe_2O_3$: 0.02–0.05<br>$SO_3$: 0.1–0.5 | 10 mm |

(2) Investigation of Phase Transformation

Each of the aforementioned glass plate samples containing nickel sulfide was heated from room temperature to 350° C. at a temperature elevation rate of 70° C./minute or more, and maintained at 350° C. for 10 minutes or more, to thereby form stable α phase in the glass. Subsequently, the plate was cooled at a cooling rate of about 50° C. (model step of quenching) and annealed from about 300° C. The phase transformation to β phase was investigated through in situ observation under a high-temperature microscope.

The annealing rates employed were 6° C./minute for Glass plate sample 1, 8° C./minute for Glass plate sample 2, 8.5° C./minute for Glass plate sample 3, 9.0° C./minute for Glass plate sample 4, 10.0° C./minute for Glass plate samples 5 and 6, 12.0° C./minute for Glass plate sample 7, and 15.0° C./minute for Glass plate sample 8.

Phase transformation from α phase to β phase was confirmed by continuously observing generation and intensity of residual stress induced by compression of glass surrounding nickel sulfide (NiS) concomitant with a 4% increase in volume during phase transformation to β phase as manifested in change in retardation, with a polarizing plate being in a cross-Nicol state and a 530 μm high-sensitive color detection plate being inserted.

Figure 13:
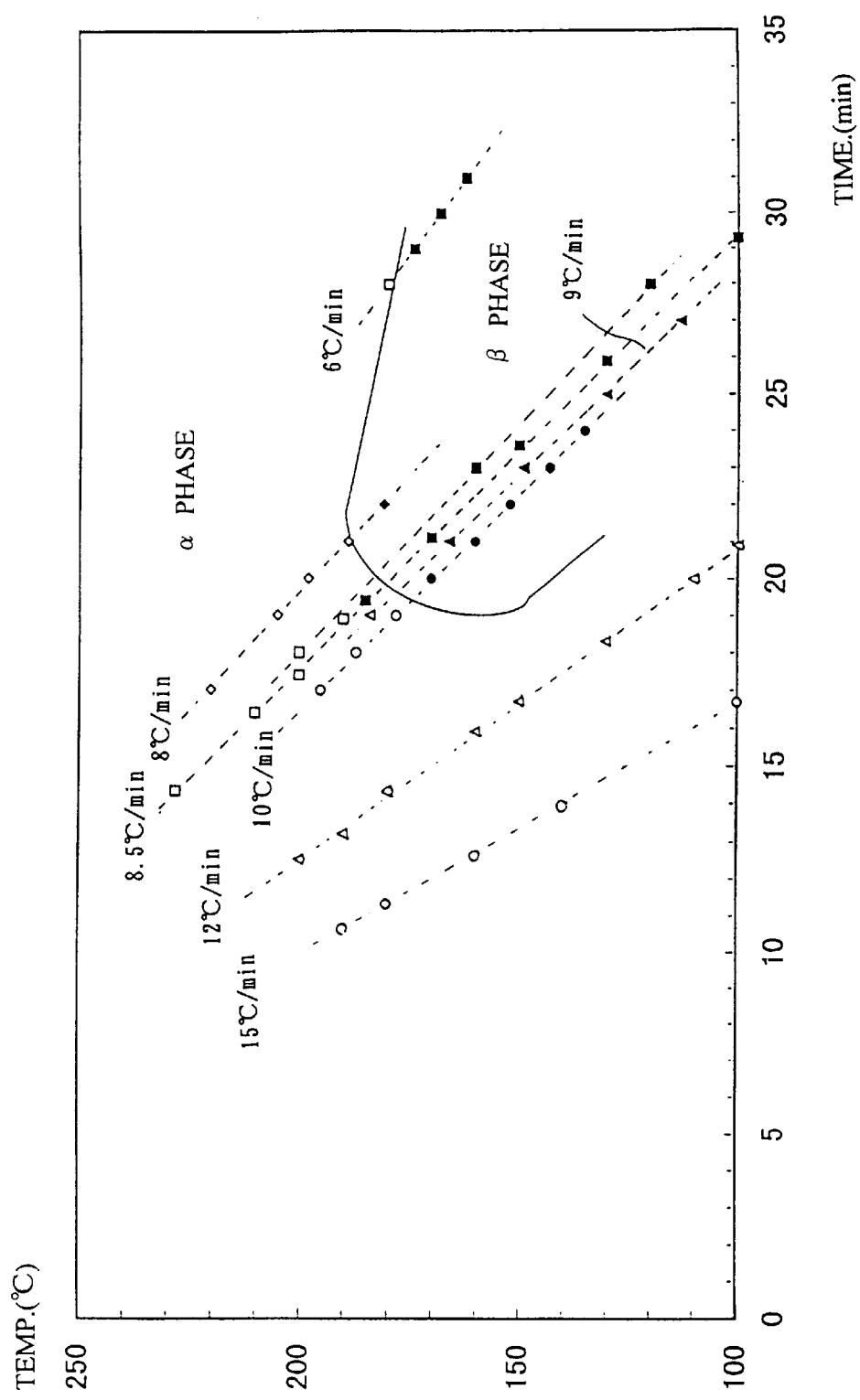
FIG. 13 is a graph showing temperature versus time relationships for causing phase transformation from α phase to β phase through continuous annealing performed in the course of a cooling process.

The state of complete transformation to β phase was judged from a point at which the compressive stress reached a maximum (i.e., a point at which retardation reached a maximum as observed under a high-temperature microscope). The results of investigation of the phase transition temperature and time for Glass plate samples 1 to 8 are shown in FIG. 13. In FIG. 13, the X-axis indicates annealing time (minutes) and the Y-axis indicates temperature (° C.). In FIG. 7, the symbol "O" indicates incomplete β phase and the symbol "•" indicates complete β phase.

As is clear from the coordinate system shown in FIG. 13, annealing at a rate less than 12° C./minute to 150° C. completes transition to β phase.

As described above, conditions for annealing rate and temperature for causing transformation of nickel sulfide from α phase to β phase during annealing in a quenching step have been determined.

In order to produce air-quench-toughened glass which is not prone to breakage caused by molten impurities such as nickel sulfide in Example 3, steps of the following sequence are preferably employed:

(1) heating glass at 600° C. or higher; (2) air-quenching (quenching) to thereby form a toughened layer in a surface portion; (3) quenching to maintain residual stress in the toughened layer while maintaining nickel sulfide in a stable α phase state; and (4) annealing in an annealing furnace from near 300° C. to 150° C. at a cooling rate less than 12° C./minute, to thereby cause transformation of nickel sulfide to β phase concomitant with an expansion in volume, which results in breakage of glass.

According to Example 3, there can be prevented spontaneous breakage of air-quench toughened glass induced by nickel sulfide present as an impurity. In addition, the process can be carried out at low cost without reducing productivity, to thereby provide great value in practice.

EXAMPLE 4

Example 4 provides a method for reliably and compulsorily breaking defective glass containing NiS without employing a soaking process.

Figure 14:
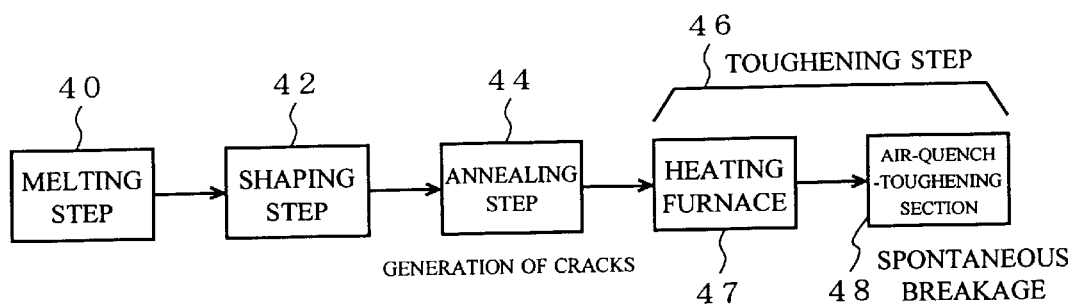
FIG. 14 is a flow chart showing steps for producing a toughened glass plate carried out in Example 3.

FIG. 14 shows a method for producing a toughened glass plate in Example 4. In a melting step 40, glass raw material is melted to thereby produce a glass substrate. The glass substrate is processed into a glass strip by means of a float method in a molding step 42, and molded after the width and length are determined. Thereafter, the thus-obtained glass plate is gradually cooled in an annealing step 44. When the glass plate is gradually cooled under predetermined conditions, the phase of NiS contained in glass is transformed from α-phase to β-phase, and cracks are generated around NiS particles.

Subsequently, in this state, the glass plate is subjected to a toughening step 46. In the toughening step, the glass plate is heated to about 600° C. in a heating furnace 47. In a temperature range in the vicinity of 600° C., glass of the target composition is not rapidly softened and the region containing cracks is not rapidly melted for bonding. Therefore, cracks grown in the annealing step are not eliminated. Subsequently, the glass plate is air-quenched in an air-quench-toughening portion 48. Difference in thermal stresses generated in the air-quenching step causes rapid enlargement and extension of cracks generated around nickel sulfide particles, and thus the glass plate breaks spontaneously without fail.

In order to predetermine the conditions under which a glass plate produced through a melting step to a molding step is gradually cooled, the following processes were conducted to thereby determine a preferred maintenance temperature and temperature-maintenance time.

Glass plate samples containing a nickel sulfide impurity at ambient temperature were prepared. Three types of glass plate samples having different compositions (wt. %) as shown in Table 4 were prepared.

TABLE 4

| Sample No. | Composition (wt. %) | Sheet thickness | Color |
|---|---|---|---|
| 1 | $SiO_2$: 71–73, $Al_2O_3$: 1.5–1.8, $MgO$: 4–4.5, $CaO$: 8–10, $Na_2O$: 13–14, $K_2O$: 0.5–1.5, $Fe_2O_3$: 0.02–0.05, $SO_3$: 0.1–0.5, | 10 mm | Colorless |
| 2 | The amount of $Fe_2O_3$ in Sample 1 is adjusted to 0.01–1.0, to thereby serve as a coloring component. | 10 mm | Pale blue |
| 3 | The amount of $Fe_2O_3$ in Sample 1 is adjusted to 0.06–0.2, and a micro-amount of Se is added. | 10 mm | Pale brown |
| 4 | A microamount of Ce is further added to Sample 2. | 4 mm | Green |

Glass plate sample 1 has a composition as shown in Table 4 and has a plate thickness of 10 mm and no color. Glass plate sample 2 has an $Fe_2O_3$ composition which is altered from that in Glass plate sample 1 to 0.01–1.0 wt. % so as to cause $Fe_2O_3$ to serve as a coloring component, and has a plate thickness of 10 mm and a pale blue color. Glass plate sample 3 has an $Fe_2O_3$ composition which is altered from that in Glass plate sample 1 to 0.06–0.2 wt. %, and a very small amount (or microamount) of Se serving as a coloring component is added therein. Glass plate sample 3 has a plate thickness of 10 mm and a pale brown color. Glass plate sample 4 is produced from Glass plate sample 4 by addition of a microamount of Ce, and has a thickness of 4 mm and a green color.

Each glass plate sample was polished so as to have a thickness of about 3 mm, and placed in a high-temperature microscope which can elevate the temperature to 500° C. The glass plate sample was heated to 450° C. or higher to thereby obtain α phase NiS which is stable at high temperature.

When the glass plate sample was gradually cooled from the heating temperature of 450° C. or higher, the sample was maintained in a temperature range of 160–280° C. so as to have a certain temperature.

By observation of compressive stress generated around an NiS impurity concomitant with phase transformation of nickel sulfide into β phase, the state of phase transformation into stable β phase was investigated. Phase transformation to β phase was confirmed by observing generation and intensity of residual stress formed due to compression of glass surrounding nickel sulfide (NiS) particles concomitant with an increase in volume during phase transformation to β phase, with a polarizing plate being in a cross-Nicol state and a 530 μm high-sensitive color detection plate being inserted at a diagonal position. The state of complete transformation to β phase was judged from a point at which the compressive stress reached a maximum (i.e., a point at which retardation reached a maximum as observed under a high-temperature microscope).

Figure 15:
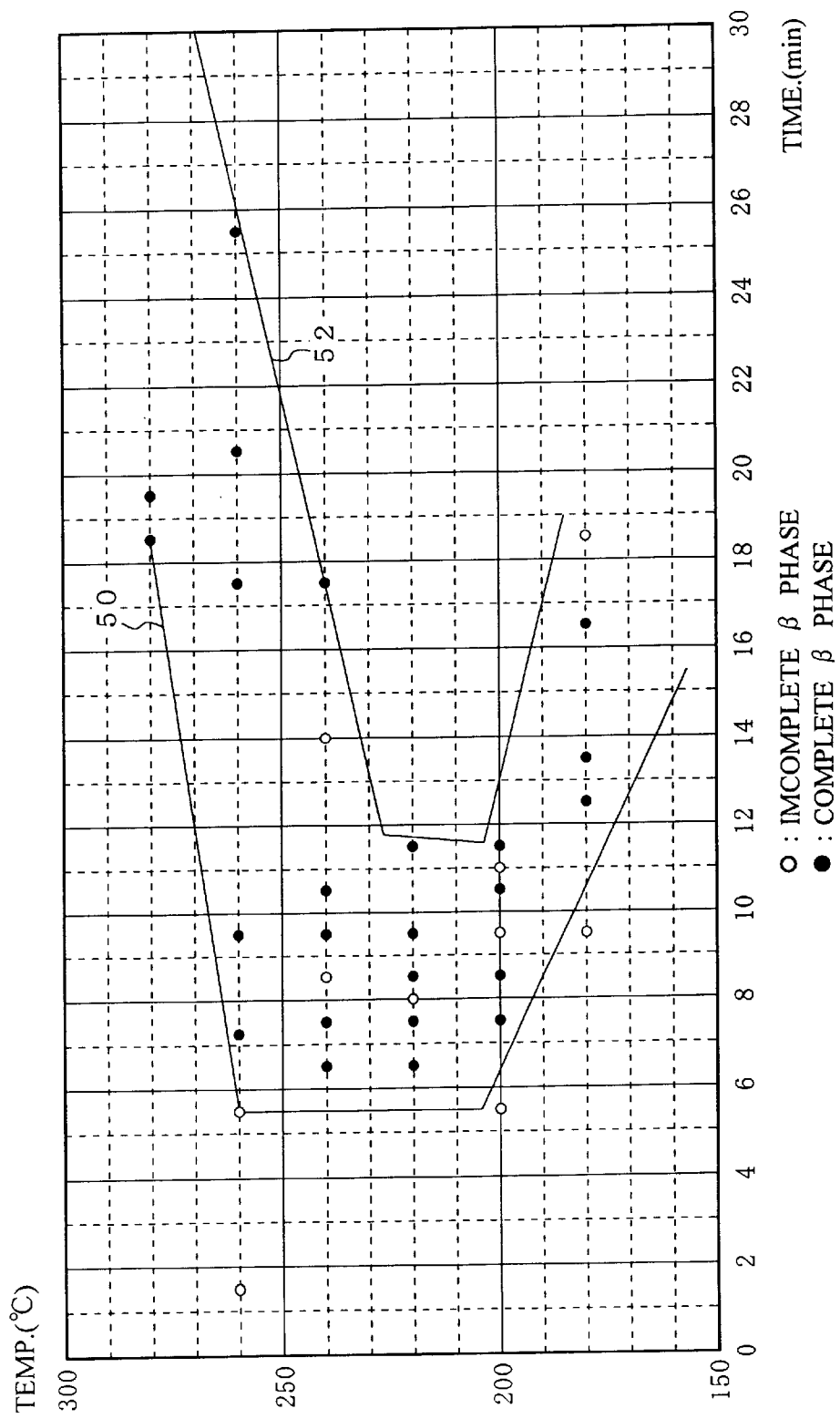
FIG. 15 is a graph showing optimum conditions of ranges of temperature and temperature maintenance time employed during annealing of a glass plate, the ranges being obtained from test results of phase transformation from α phase to β phase of nickel sulfide contained in glass plate samples.

A point at which NiS was transformed from α phase to β phase in the above-described step was plotted on a graph. FIG. 15 shows the graph. In the graph, the Y-axis axis represents temperature (° C.) and the X-axis axis represents time (minutes).

In order to investigate the interface of phase transformation of NiS from α phase to β phase and the region in which β phase is stable, as carried out in the above step, the step was repeated many times for different combinations of maintenance temperatures and types of sample glass.

FIG. 15 shows finally obtained plots for samples of glass plate sample 1. These plots represent phase transformation at temperatures of 280° C., 260° C., 240° C., 220° C., 200° C., 180° C., and 160° C. In the figure, the symbol "O" indicates incomplete β phase and the symbol "•" indicates complete β phase. When curves 30 and 32 which surround plots showing occurrence of phase transformation are drawn, it is apparent that temperature and time should be maintained within the region between the curves 50 and 52:

280° C. (maintenance for 19–30 minutes);
260° C. (maintenance for 6–26 minutes);
240° C. (maintenance for 6–18 minutes);
220° C. (maintenance for 6–12 minutes);
200° C. (maintenance for 6–13 minutes);
180° C. (maintenance for 10–20 minutes); and
160° C. (maintenance for 15–30 minutes).

Samples of glass plate samples 2, 3, and 4 were investigated in the same manner as described above. As a result, conditions corresponding to those determined for glass plate sample 1 were obtained.

The case in which a certain temperature is maintained for a predetermined time during annealing is described above.

Figure 16:
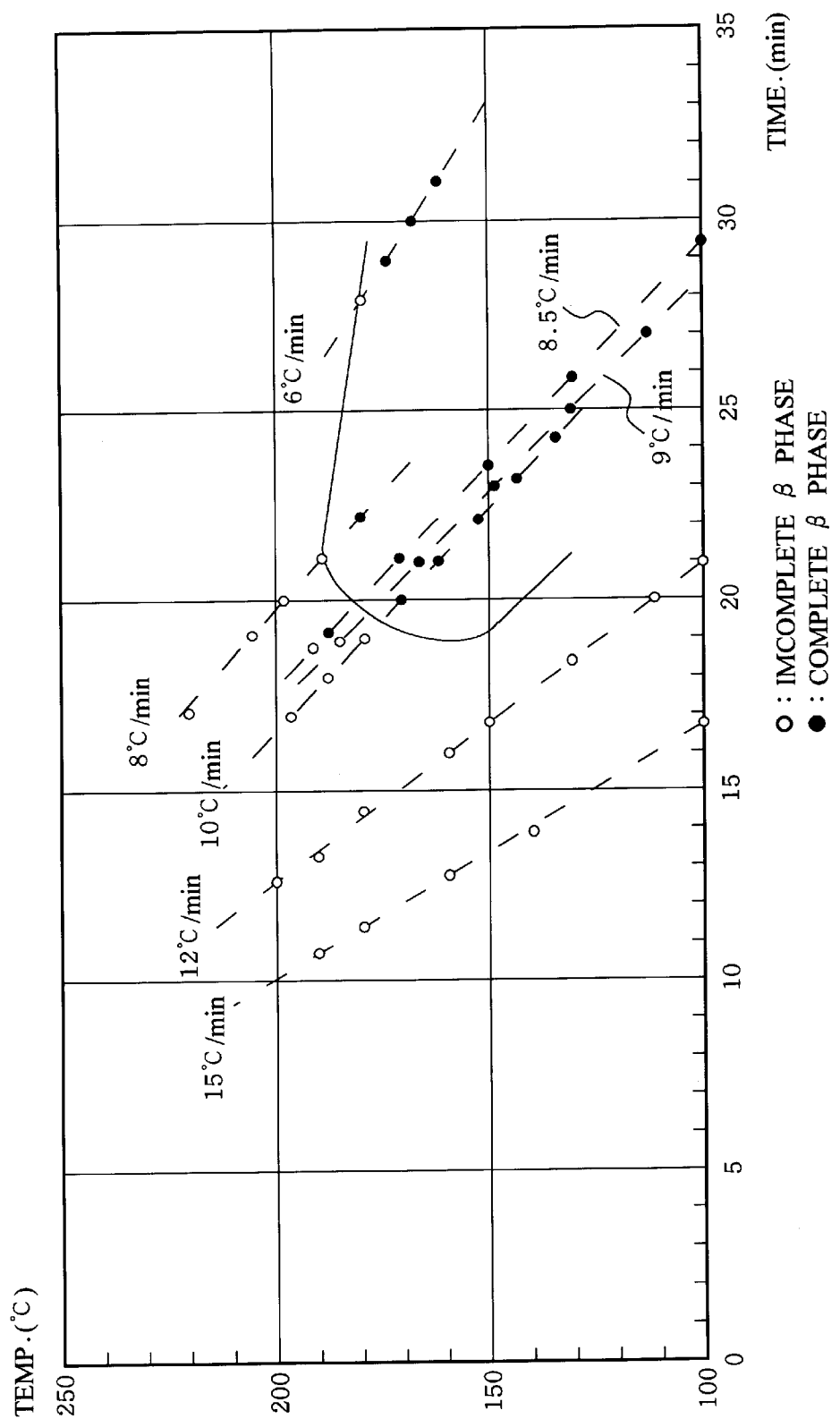
FIG. 16 is a graph showing optimum ranges of temperature and time for annealing for a prolonged time employed during annealing of a glass plate, the ranges being obtained from test results of phase transformation from α phase to β phase of nickel sulfide contained in glass plate samples.

In the case in which glass plate sample 1 is gradually cooled from a temperature below the annealing point of glass, phase transformation from α phase to β phase concomitant with change in annealing rate was plotted on a graph. FIG. 16 shows the graph. Annealing rates were 6° C./minute, 8° C./minute, 8.5° C./minute, 9° C./minute, 10° C./minute, 12° C./minute, and 15° C./minute. In the same manner as in FIG. 15, the symbol "O" indicates incomplete β phase and the symbol "•" indicates complete β phase. As is apparent from FIG. 15, an appropriate annealing rate for phase transformation to β phase is 10° C./minute or less.

As described above, there were determined conditions of temperature and treatment time for attaining phase transformation of NiS from α phase to β phase in an annealing step.

The above-described conditions of temperature and treatment time apply to nickel particles themselves contained in glass. In a practical producing process, temperature elevation conditions are changed concomitant with the thickness of glass plate, and therefore, an annealing furnace is preferably regulated on the basis of change in temperature of glass surfaces with time.

A method for producing a toughened glass plate in Example 4 will be described in reference to FIG. 14.

In a melting step 40, glass raw material is melted to thereby produce a glass substrate. In a molding step 42 the glass substrate is processed into a glass strip by means of a float method, and molded after the width and the length are determined. Thereafter, the thus-obtained glass plate is gradually cooled in an annealing step 44. When the glass plate is gradually cooled under the above-described conditions, the phase of NiS contained in glass is transformed from α-phase to β-phase. For example, when the surface temperature of the glass plate becomes 220° C. during annealing, an annealing furnace is regulated so as to maintain 220° C. for 6–12 minutes. Thus, the phase of NiS is transformed to β phase to thereby generate cracks around NiS particles.

Subsequently, in this state, the glass plate is subjected to a toughening step 46. In the toughening step, the glass plate is heated to about 600° C. in a heating furnace 47. Within a temperature range in the vicinity of 600° C., glass of the target composition is not rapidly softened and the region containing cracks is not rapidly melted for bonding. Therefore, cracks grown in the annealing step are not eliminated. Subsequently, the glass plate is air-quenched in an air-quench-toughening portion 48. Difference in thermal stresses generated in the air-quenching step causes rapid enlargement and extension of cracks generated around nickel sulfide particles, and thus the glass plate breaks spontaneously without fail.

In the above-described process, a glass plate containing NiS is removed without fail.

In Example 4, cracks can be grown around nickel sulfide contained in a produced glass substrate, and a defective product containing NiS can be continuously and effectively removed in the production process for a toughened glass plate. Therefore, the process can contribute to energy conservation and automation in production of a toughened glass plate.

EXAMPLE 5

Example 5 provides a method for reliably and compulsorily breaking defective glass containing NiS without employing a soaking process.

Figure 17:
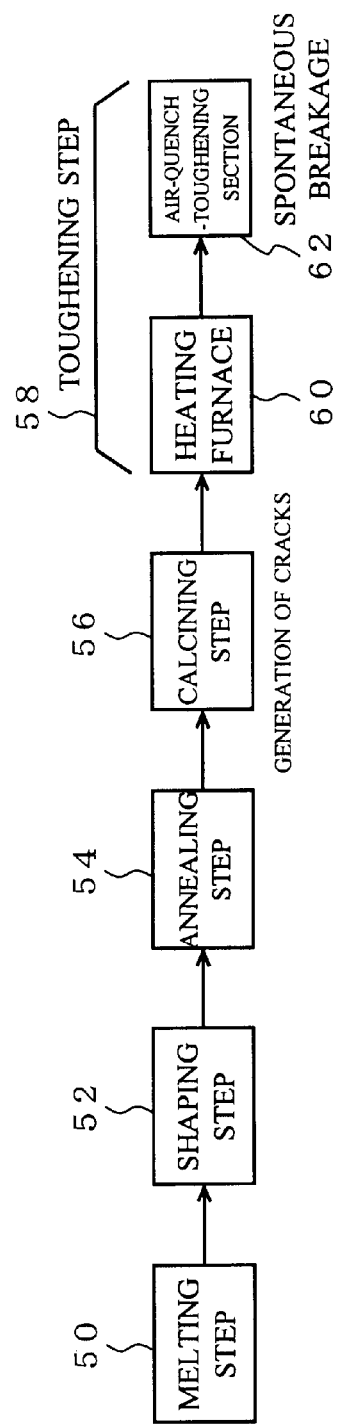
FIG. 17 is a flow chart showing steps for producing a toughened glass plate carried out in Example 4.

FIG. 17 shows a practical process for producing a toughened glass plate in Example 5. In a melting step 50, glass raw material is melted to thereby produce a glass substrate. The glass substrate is processed into a glass strip by means of a float method in a molding step 52, and molded after the width and the length are determined. Thereafter, the thus-obtained glass plate is gradually cooled in an annealing step 54. Generally, the glass plate is subjected to a toughening step, but in Example 5, a firing step 56 is introduced as a pretreatment for an annealing step. In the pretreatment step, the glass plate is heated to a predetermined temperature at a predetermined temperature elevation rate. Thus, when the glass plate contains NiS, cracks are generated around NiS particles.

Subsequently, in this state, the glass plate is subjected to a toughening step 58. In the toughening step, the glass plate is heated to about 600° C. in a heating furnace 60. Within a temperature range in the vicinity of 600° C., glass of the target composition is not rapidly softened and the region of cracks is not rapidly melted for bonding. Therefore, cracks grown in the pretreatment step are not eliminated. Subsequently, the glass plate is air-quenched in an air-quench toughening portion 62. Difference in thermal stresses generated in the air-quenching step causes rapid enlargement and extension of cracks generated around nickel sulfide particles, and thus the glass plate breaks spontaneously without fail.

In order to predetermine heating conditions to be employed in the pretreatment step, the following processes were carried out to thereby determine a preferred temperature elevation rate and temperature range.

Glass plate samples containing a nickel sulfide impurity at ambient temperature were prepared. Four types of glass plate samples having different compositions (wt. %) and thicknesses as shown in Table 5 were prepared.

TABLE 5

| Sample No. | Composition (wt. %) | Sheet thickness | Color |
|---|---|---|---|
| 1 | $SiO_2$: 71–73, $Al_2O_3$: 1.5–1.8, MgO: 4–4.5, CaO: 8–10, $Na_2O$: 13–14, $K_2O$: 0.5–1.5, $Fe_2O_3$: 0.02–0.05, $SO_3$: 0.1–0.5, | 10 mm | Colorless |
| 2 | The amount of $Fe_2O_3$ in Sample 1 is adjusted to 0.01–1.0, to thereby serve as a coloring component. | 10 mm | Pale blue |
| 3 | The amount of $Fe_2O_3$ in Sample 1 is adjusted to 0.06–0.2, and a microamount of Se is added. | 10 mm | Pale brown |
| 4 | A microamount of Ce is further added to Sample 2. | 4 mm | Green |

Glass plate sample 1 has a composition as shown in Table 5 and has a plate thickness of 10 mm and no color. Glass plate sample 2 has an $Fe_2O_3$ composition which is altered from that in Glass plate sample 1 to 0.01–1.0 wt. % so as to cause $Fe_2O_3$ to serve as a coloring component, and has a plate thickness of 10 mm and a pale blue color. Glass plate sample 3 has an $Fe_2O_3$ composition which is altered from that in Glass plate sample 1 to 0.06–0.2 wt. %, and a microamount of Se serving as a coloring component is added therein. Glass plate sample 3 has a plate thickness of 10 mm and a pale brown color. Glass plate sample 4 is produced from Glass plate sample 2 by addition of a very small amount (or microamount) of Ce, and has a thickness of 4 mm and a green color.

Each glass plate sample was polished so as to have a thickness of about 3 mm, and placed in a high-temperature microscope which can elevate temperature to 500° C. The temperature and time for completing phase transformation of all NiS particles to β phase were investigated through continuous observation of phase transformation from α phase to β phase at different temperature elevation rates: 3° C./minute, 5° C./minute, 6° C./minute, 10° C./minute, 20° C./minute, 40° C./minute, and 50° C./minute. Phase transformation to β phase was confirmed by observing generation and intensity of residual stress attributable to compression of glass surrounding nickel sulfide (NiS) particles concomitant with an increase in volume during phase transformation to β phase, with a polarizing plate being in a cross-Nicol state and a 530 μm high-sensitive color detection plate being inserted at a diagonal position. The state of complete transformation to β phase was judged from a point at which the compressive stress reached a maximum (i.e., a point at which retardation reached a maximum as observed under a high-temperature microscope).

Figure 18:
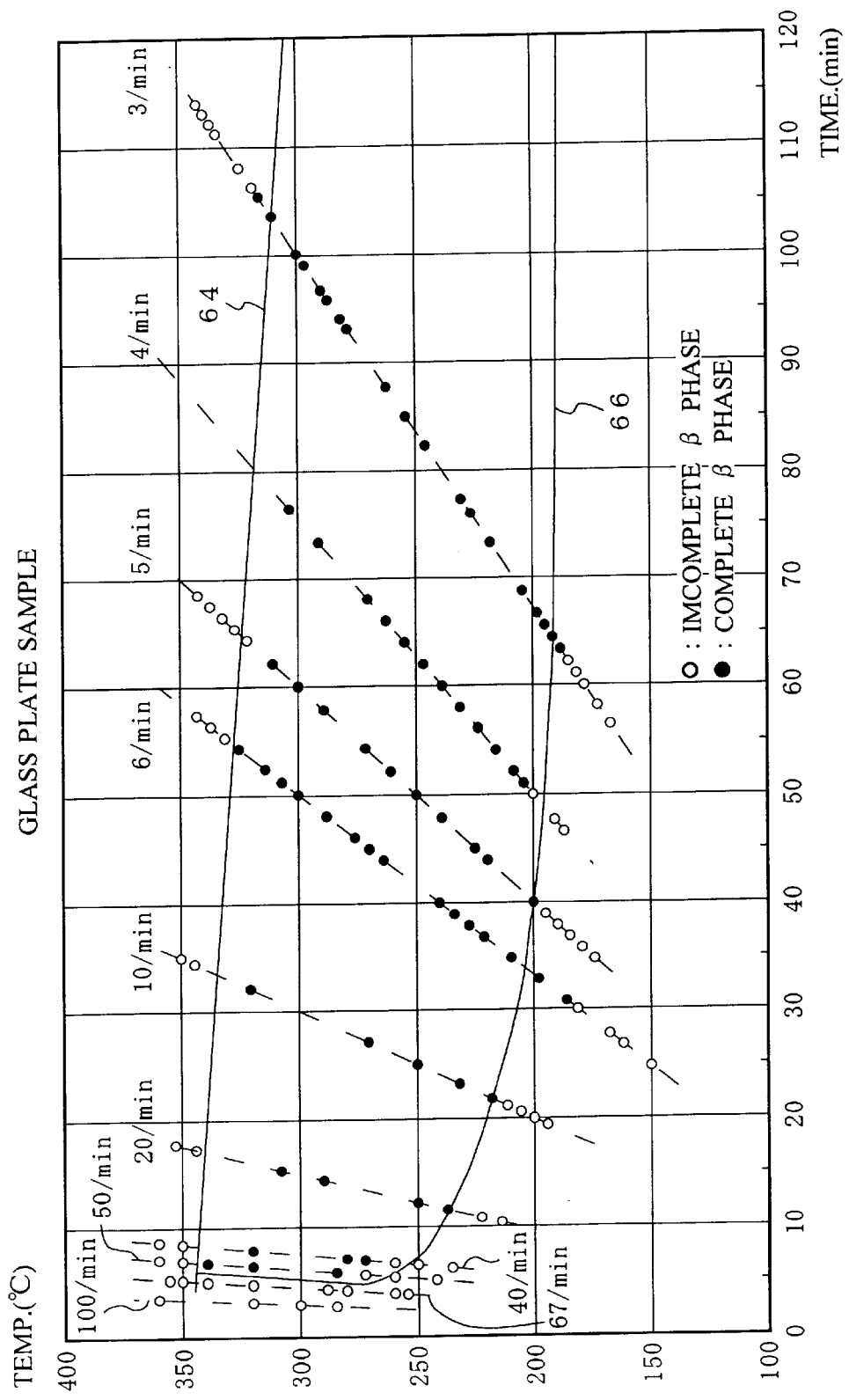
FIG. 18 is a graph showing optimum ranges of temperature and time for firing, the ranges being obtained from test results of phase transformation from α phase to β phase of nickel sulfide contained in glass plate samples.

A point at which NiS was transformed from α phase to β phase in the above-described step was plotted on a graph. FIG. 18 shows the graph. In the graph, the Y-axis represents temperature (° C.) and the X-axis represents time (minutes).

In order to investigate the interface of phase transformation of NiS from α phase to β phase and the region in which β phase is stable, as carried out in the above step, the step was repeated many times for different combinations of temperature elevation rates and types of sample glass.

FIG. 18 shows finally obtained plots for samples of glass plate sample 1. These plots represent phase transformation at temperature elevation rates of 3° C./minute, 5° C./minute, 6° C./minute, 10° C./minute, 20° C./minute, 40° C./minute, and 50° C./minute. In the figure, the symbol "O" indicates an incomplete β phase and the symbol "•" indicates a complete β phase.

In the graph, plots in the interface between incomplete β phase and complete β phase were connected to thereby draw phase transformation curves 64 and 66. In the region between these two curves, NiS is transformed to complete β phase. In the above temperature elevation rates, there are provided temperature ranges in which NiS is transformed to β phase, as follows:

Temperature elevation rate of 3° C./minute (Temperature range of 170–320° C.);

Temperature elevation rate of 5° C./minute (Temperature range of 180–320° C.);

Temperature elevation rate of 6° C./minute (Temperature range of 185–325° C.);

Temperature elevation rate of 10° C./minute (Temperature range of 215–340° C.);

Temperature elevation rate of 20° C./minute (Temperature range of 235–345° C.);

Temperature elevation rate of 40° C./minute (Temperature range of 270–350° C.); and Temperature elevation rate of 50° C./minute (Temperature range of 285–350° C.).

As described above, there were determined conditions for temperature elevation rate and temperature range for phase transformation of NiS from α phase to β phase in a pretreatment step.

Samples of glass plate samples 2, 3, and 4 were investigated in the same manner as described above. As a result, results corresponding to those for glass plate sample 1 were obtained.

The above-described conditions for temperature elevation rate and temperature range apply to nickel particles themselves contained in glass. In a practical process, temperature elevation conditions are changed concomitant with the thickness of glass plate, and therefore, an annealing furnace is preferably regulated on the basis of change in temperature of glass surfaces with time.

Figure 19:
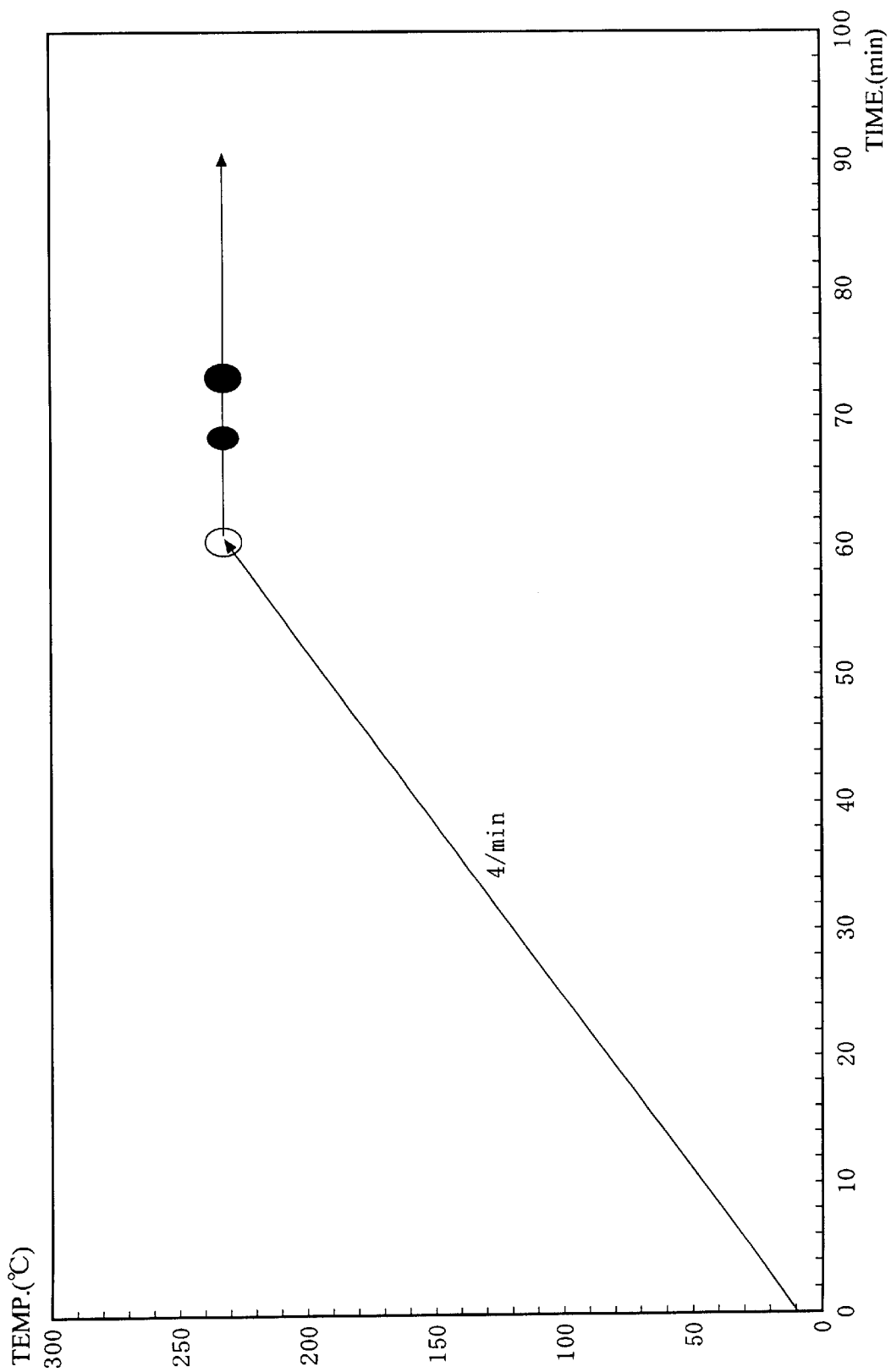
FIG. 19 is a graph showing optimum ranges of temperature and time for firing, the ranges being obtained from test results of phase transformation from α phase to β phase of nickel sulfide contained in glass plates containing a coloring component.

FIG. 19 shows phase transformation of NiS in each sample of glass plate samples 2, 3, and 4 which contain a coloring component. When the sample was heated to 230° C. at 4° C./minute, phase transformation did not occur. However, when the sample was maintained at 230° C., phase transformation to β phase was confirmed. Thus, even when phase transformation of NiS to β phase does not occur by heating of a sample at a predetermined temperature elevation rate, phase transformation may occur when the sample is maintained at a heating temperature for a predetermined time.

A method for producing a toughened glass plate in Example 4 will be described in reference to FIG. 17. In a melting step 50, glass raw material is melted to thereby produce a glass substrate. The glass substrate is processed into a glass strip by means of a float method in a molding step 52, and molded after the width and the length are determined. Thereafter, the thus-obtained glass plate is gradually cooled in an annealing step 54. In a firing step 56, for example, the glass plate is heated to 250° C. at 5° C./minute. Thus, when the glass plate contains NiS, cracks are generated around NiS particles.

Subsequently, in this state, the glass plate is subjected to a toughening step 58. In the toughening step, the glass plate is heated to about 600° C. Within a temperature range in the vicinity of 600° C., glass of the target composition is not rapidly softened and the region of cracks is not rapidly melted for bonding. Therefore, cracks grown in the pretreatment step are not eliminated. Subsequently, the glass plate is air-quenched. Difference in thermal stresses generated in the air-quenching step causes rapid enlargement and extension of cracks generated around nickel sulfide particles, and thus the glass plate breaks spontaneously without fail.

In the above-described method, a glass plate containing NiS is removed without fail.

In Example 5, cracks can be grown around nickel sulfide contained in a produced glass substrate, and a defective product containing NiS can be continuously and effectively removed in the production process for a toughened glass plate. Therefore, the process can contribute to energy conservation and automation in production of a toughened glass plate.

Industrial Applicability

In the method for producing an air-quench-toughened glass plate according to the present invention, phase transformation of nickel sulfide (NiS) contained in a glass plate from α phase to β phase is carried out completely, while the glass plate is compulsorily broken through expansion in volume concomitant with phase transformation, to thereby remove defective products. Thus, the invention provides NiS-free toughened glass plates of high quality. Such toughened glass plates find use in industry; for example, as glass used in buildings and automobiles.

What is claimed is:

1. A method for producing a toughened glass plate comprising the steps of:
   carrying out air-quench toughening for quenching a glass plate heated to near a softening point thereof to thereby generate compressive stress in the surface layers of the glass plate;
   lowering the temperature of the toughened glass plate to ambient temperature; and
   elevating the temperature of the glass plate from ambient temperature to a predetermined temperature to thereby cause phase transformation of nickel sulfide (NiS) contained as a molten impurity in the glass plate from α-NiS (α phase) to β-NiS (β phase) concomitant with expansion of the volume thereof, resulting in compulsory breakage of the glass plate for removing defective products, characterized in that the predetermined temperature and a temperature elevation rate to the predetermined temperature satisfy any one of the following conditions:
   the temperature elevation rate is about 3° C./minute, and the predetermined temperature is in the range of 170–320° C.;
   the temperature elevation rate is about 5° C./minute, and the predetermined temperature is in the range of 180–320° C.;
   the temperature elevation rate is about 6° C./minute, and the predetermined temperature is in the range of 185–325° C.;
   the temperature elevation rate is about 20° C./minute, and the predetermined temperature is in the range of 235–345° C.;
   the temperature elevation rate is about 40° C./minute, and the predetermined temperature is in the range of 270–350° C.; or
   the temperature elevation rate is about 50° C./minute, and the predetermined temperature is in the range of 285–350° C.

2. A method for producing a toughened glass plate according to claim to claim 1, wherein the temperature of the glass plate is elevated to said predetermined temperature range, and subsequently the glass plate is held for a certain period of time at the elevated temperature.

3. A method for producing a toughened glass plate according to claim 2, wherein the certain period of time is 5–60 minutes.

4. A method for producing a toughened glass plate according to any one of claims 1 or 3, wherein at least selenium (Se) is added into the glass plate as a coloring component.

5. A method for producing a toughened glass plate including a production step for a glass plate, immediately followed by a toughening step, characterized in that the method comprises the steps of:
   in the course of carrying out a pretreatment step prior to the toughening step, heating the glass plate to thereby cause phase transformation of the nickel sulfide (NiS) contained in the glass plate from α-NiS (α phase) to β-NiS (β phase) concomitant with expansion of the volume thereof, which generates cracking around nickel sulfide particles; and
   in a toughening step following the pretreatment step, quenching the glass plate from near the softening point thereof to thereby generate compressive stress in the surface layers of the glass plate and, subsequently, causing drastic growth in cracks to thereby compulsorily cause breakage of the glass plate so as to remove defective products, and a predetermined temperature and a temperature elevation rate to the predetermined temperature employed in the pretreatment step satisfy any one of the following conditions:
   the temperature elevation rate is about 3° C./minute, and the predetermined temperature is in the range of 170–320° C.;
   the temperature elevation rate is about 5° C./minute, and the predetermined temperature is in the range of 180–320° C.;
   the temperature elevation rate is about 6° C./minute, and the predetermined temperature is in the range of 185–325° C.;
   the temperature elevation rate is about 20° C./minute, and the predetermined temperature is in the range of 235–345° C.;

the temperature elevation rate is about 40° C./minute, and the predetermined temperature is in the range of 270–350° C.; or the temperature elevation rate is about 50° C./minute, and the predetermined temperature is in the range of 285–350° C.

6. A method for producing a toughened glass plate according to claim 5, wherein, when a further growth of the cracks is required, the glass plate is further held at least for a predetermined period of time not more than 60 minutes at an arbitrary temperature within any of the temperature ranges.

7. A method for producing a toughened glass plate according to claim 5 or 6, wherein at least selenium (Se) is added into the glass plate as a coloring component.

* * * * *